US012202166B2

United States Patent
Strasky et al.

(10) Patent No.: US 12,202,166 B2
(45) Date of Patent: Jan. 21, 2025

(54) LOG AND CANT OPTIMIZATION

(71) Applicants: Douglas G. Strasky, Parksville (CA);
Stephen Doiel, Vancouver, WA (US);
Gerald David Larson, Nanaimo (CA);
Robert Arnold, Eugene, OR (US);
Ryan Munion, Eugene, OR (US);
Dimitrios Paul Marinakis, Duncan (CA)

(72) Inventors: Douglas G. Strasky, Parksville (CA);
Stephen Doiel, Vancouver, WA (US);
Gerald David Larson, Nanaimo (CA);
Robert Arnold, Eugene, OR (US);
Ryan Munion, Eugene, OR (US);
Dimitrios Paul Marinakis, Duncan (CA)

(73) Assignee: USNR, LLC, Woodland, WA (US)

( * ) Notice: Subject to any disclaimer, the term of this patent is extended or adjusted under 35 U.S.C. 154(b) by 544 days.

(21) Appl. No.: 17/114,429

(22) Filed: Dec. 7, 2020

(65) Prior Publication Data
US 2021/0086391 A1    Mar. 25, 2021

Related U.S. Application Data

(62) Division of application No. 15/907,269, filed on Feb. 27, 2018, now Pat. No. 10,857,692.
(Continued)

(51) Int. Cl.
*B27B 1/00*      (2006.01)
*B23D 59/00*     (2006.01)
(Continued)

(52) U.S. Cl.
CPC ............ *B27B 1/007* (2013.01); *B23D 59/008* (2013.01); *B27B 25/00* (2013.01); *B27B 31/00* (2013.01);
(Continued)

(58) Field of Classification Search
CPC ......... B27B 1/007; B27B 25/00; B27B 31/00; B27B 31/06; B23D 59/008; B27M 1/08;
(Continued)

(56) References Cited

U.S. PATENT DOCUMENTS

2004/0246473 A1 * 12/2004 Hermary ............... G01B 11/245
356/237.1
2006/0219071 A1    10/2006 Pobuda et al.
(Continued)

FOREIGN PATENT DOCUMENTS

EP        3585577 A1    1/2020

OTHER PUBLICATIONS

McNeel, Robert, "UnrollSrf Rhino 3-D modeling", Sep. 17, 2015, 6 pages, Accessible at http://docs.mcneel.com/rhino/5/help/en-us/commands/unrollsrf.htm (Year: 2015).*
(Continued)

*Primary Examiner* — Thomas C Lee
*Assistant Examiner* — Tyler Dean Hedrick
(74) *Attorney, Agent, or Firm* — Schwabe, Williamson & Wyatt, P.C.

(57) ABSTRACT

Embodiments provide methods, apparatuses, and systems for cutting wood workpieces, such as logs and cants, into desired products. In various embodiments, after a log is chipped into a cant, the cant may be scanned and re-optimized based on the new scan data and information about the source log, such as simulated orientation parameters, a 3D model, and/or potential cut solutions. In other embodiments, data from multiple sensor types may be used in combination to detect splits in logs, cants, or both. Optionally, re-optimization and split detection techniques may be used in combination to improve wood volume recovery, value, and/or throughput speed.

20 Claims, 15 Drawing Sheets

Related U.S. Application Data

(60) Provisional application No. 62/464,339, filed on Feb. 27, 2017.

(51) Int. Cl.
| | |
|---|---|
| *B27B 25/00* | (2006.01) |
| *B27B 31/00* | (2006.01) |
| *B27B 31/06* | (2006.01) |
| *B27M 1/08* | (2006.01) |
| *G01B 11/245* | (2006.01) |
| *G05B 19/4097* | (2006.01) |

(52) U.S. Cl.
CPC ............... *B27B 31/06* (2013.01); *B27M 1/08* (2013.01); *G01B 11/245* (2013.01); *G05B 19/4097* (2013.01); *G05B 2219/42155* (2013.01)

(58) Field of Classification Search
CPC .............. G01B 11/245; G05B 19/4097; G05B 2219/42155
See application file for complete search history.

(56) References Cited

U.S. PATENT DOCUMENTS

| | | | |
|---|---|---|---|
| 2014/0238546 A1* | 8/2014 | Barker | B27B 31/06 144/357 |
| 2016/0031110 A1 | 2/2016 | Middleton et al. | |

OTHER PUBLICATIONS

Australian Patent Office—Examination Report mailed Jan. 31, 2023, 5 pages.
Linck, "Plant control and automation", published by Apr. 19, 2016, Retrieved from the Internet <URL: https://web.archive.org/web/20160419011504/http://www.linck.com/en/content/solutions/recovery-optimisation.html.
European Patent Office—Article 94(3) issued Dec. 23, 2021 from European Patent Application No. 18757771.3, 8 pages.
European Patent Office—Extended European Search Report issued Nov. 24, 2020 from European Patent Application No. 18757771.3. Linck, "Plant control and automation", (Oct. 31, 2016), Linck, URL: https://web.archive.org/web/20161031042254/https://www.linck.com/en/content/solutions/plant-control-and-automation.html, (Oct. 31, 2016), XP002800993 [X] 1,2,8-10 the whole document [A] 6,7,12-14 [Y] 11,15 [I] 3-5.
New Zealand Patent Office—Examination Report issued Aug. 21, 2024, from NZ Patent Application No. 757667, 7 pages.

* cited by examiner

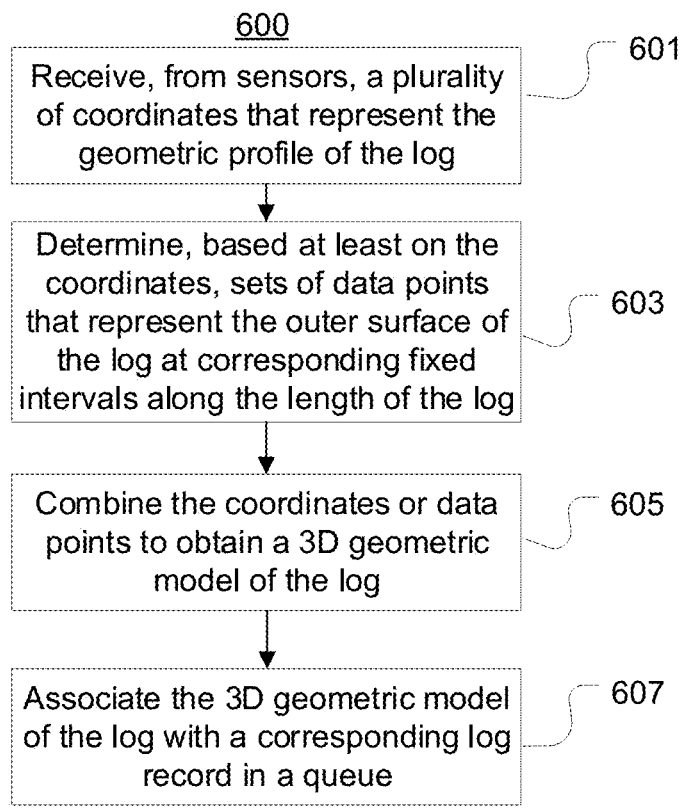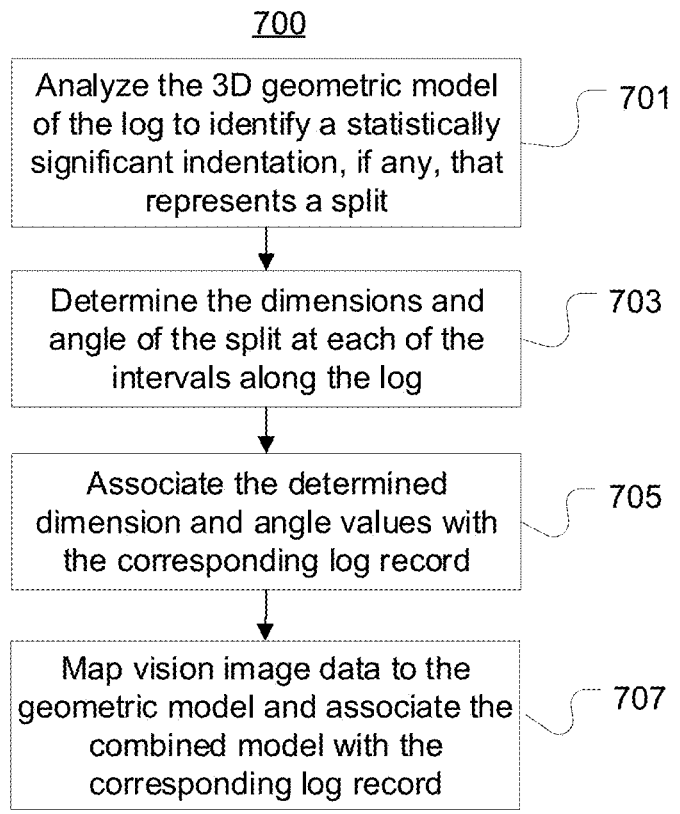

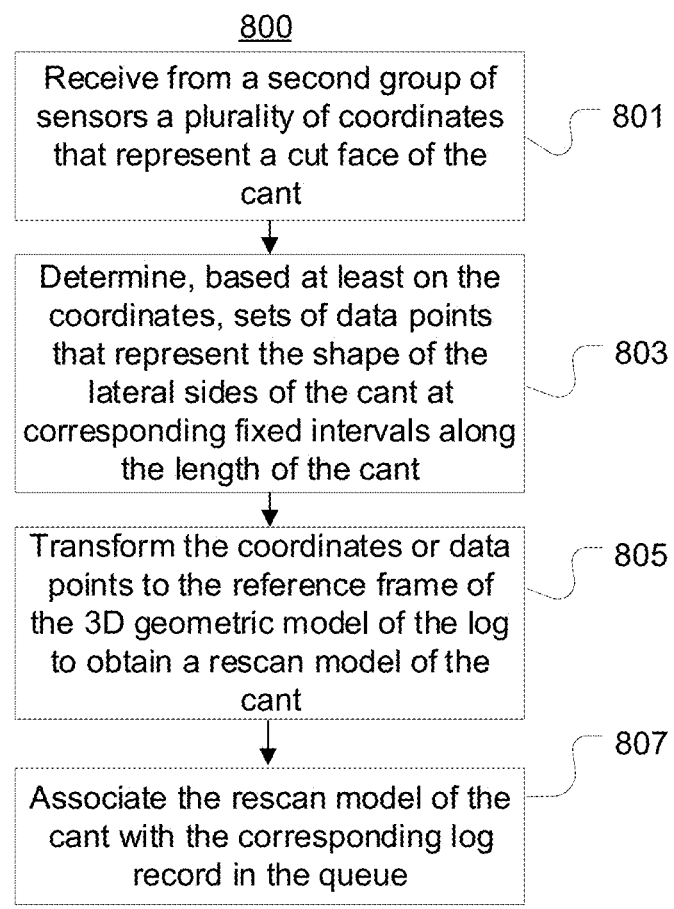

801 — Receive from a second group of sensors a plurality of coordinates that represent a cut face of the cant 803 — Determine, based at least on the coordinates, sets of data points that represent the shape of the lateral sides of the cant at corresponding fixed intervals along the length of the cant 805 — Transform the coordinates or data points to the reference frame of the 3D geometric model of the log to obtain a rescan model of the cant 807 — Associate the rescan model of the cant with the corresponding log record in the queue

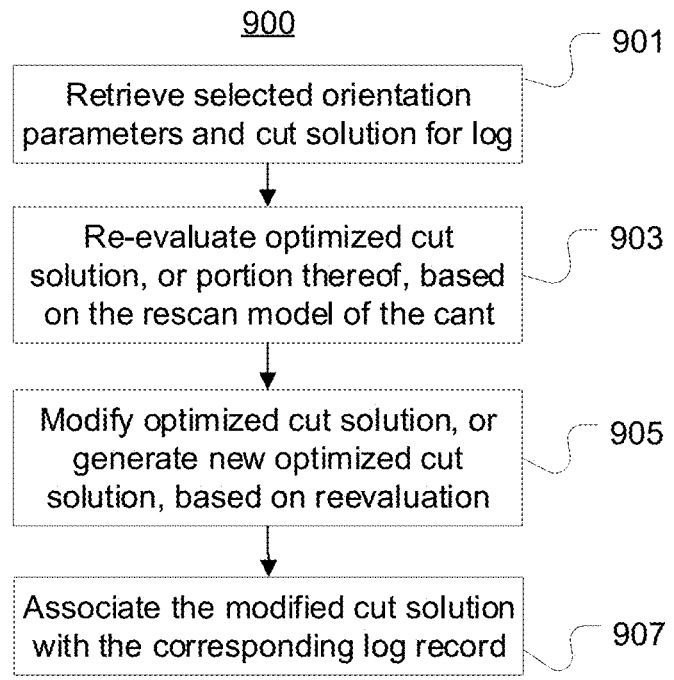

901 — Retrieve selected orientation parameters and cut solution for log

903 — Re-evaluate optimized cut solution, or portion thereof, based on the rescan model of the cant 905 — Modify optimized cut solution, or generate new optimized cut solution, based on reevaluation 907 — Associate the modified cut solution with the corresponding log record

LOG AND CANT OPTIMIZATION

CROSS-REFERENCE TO RELATED APPLICATIONS

This application is a division of U.S. patent application Ser. No. 15/907,269 filed Feb. 27, 2018, which claims the benefit of U.S. Provisional Patent Application No. 62/464,339 filed Feb. 27, 2017, all titled "Log And Cant Optimization," the disclosures of which are hereby incorporated in their entirety.

BACKGROUND

A common strategy for cutting logs into lumber involves scanning the log, calculating an optimized cut solution, cutting side boards and center boards from the log according to the optimized cut solution, and trimming the side boards and center boards to length.

The optimized cut solution assumes that the log will be in a particular position as it is sawn. If the log shifts downstream of the scanner or is not turned to the correct angle, implementation of the optimized cut solution may not be possible, and some boards may be cut improperly.

If the log has a split that extends through several of the cut products, the value obtained from the log may be greatly reduced. However, splits can be difficult to detect in images of debarked logs, which have rough outer surfaces, and the images typically do not convey information about the depth of the split. Some sawmills attempt to minimize the impact of a split by rotating the log to place the split at a predetermined angle (e.g., 270 degrees) before cutting the log. Again, if the log is not rotated to the correct angle, the split may reduce the anticipated recovery.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

FIG. 6 illustrates a method of generating a 3D model of a log;

FIG. 7 illustrates a method of detecting splits in a log;

FIG. 8 illustrates a method of generating a rescan 3D cant model;

FIG. 9 illustrates a method of re-optimizing a cant;

DETAILED DESCRIPTION OF DISCLOSED EMBODIMENTS

Figure 1:
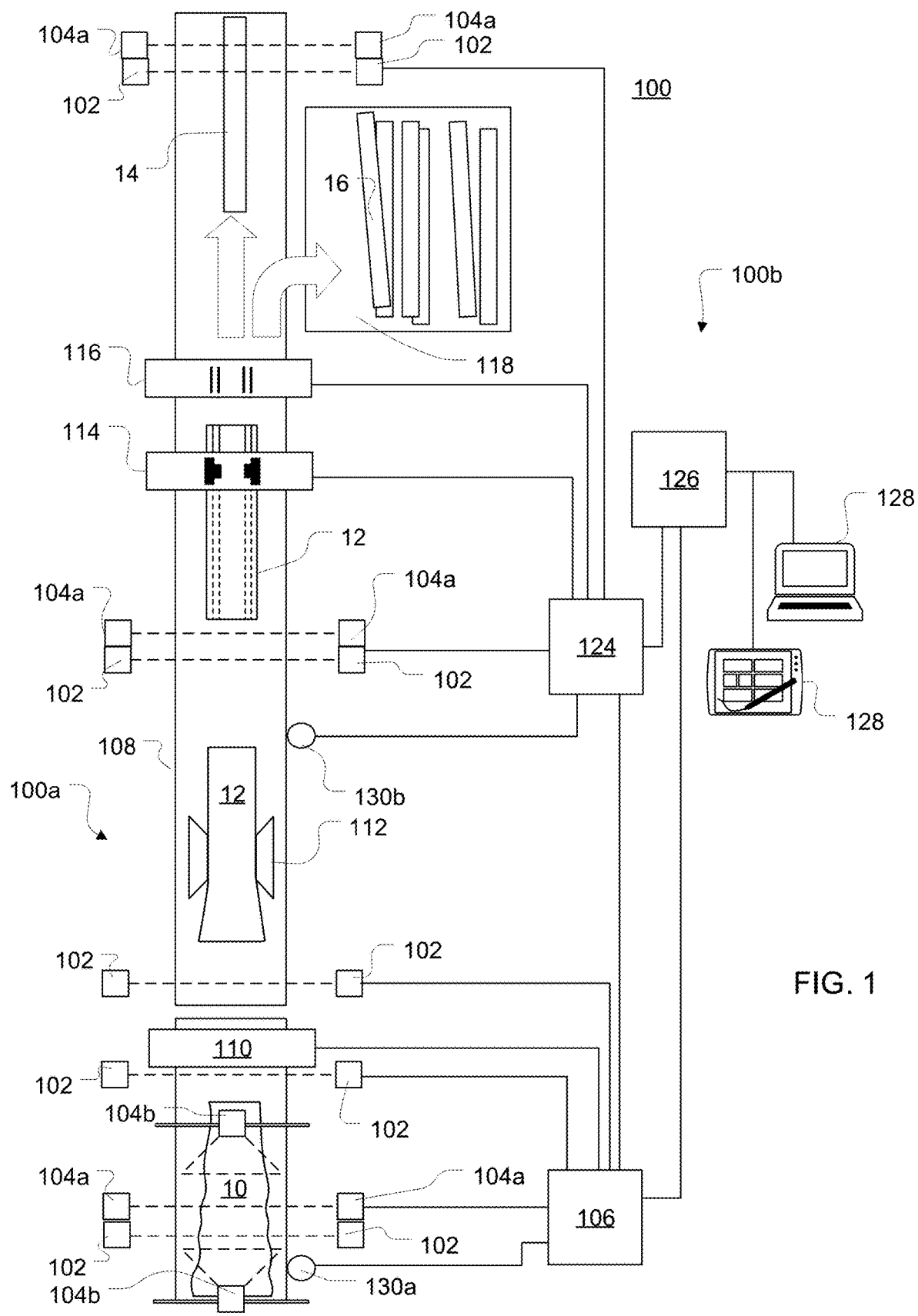
FIG. 1 illustrates a schematic view of a primary breakdown line.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

For clarity, as used herein, a "flitch" is a piece of wood with opposite machined faces joined by wane edges, typically produced by cutting longitudinally through a cant generally parallel to a machined face of the cant. In contrast, a "side board" is a piece of wood that has opposite machined faces joined by two edges, at least one of which is machined before the piece of wood is severed from a primary workpiece, typically produced by chipping a machined face of a cant to form the profile of the desired board before sawing the board from the remaining cant. A "secondary workpiece" may be a flitch or a side board.

In exemplary embodiments, a computing device may be endowed with one or more components of the disclosed apparatuses and/or systems and may be employed to perform one or more methods as disclosed herein. Functions/methods attributed to a particular computing device in the examples described below may instead be distributed among two or more computing devices, and vice versa.

The present description relates to methods, apparatuses, and systems for cutting wood workpieces, such as logs and cants. In various embodiments, after a log is chipped into a cant, the cant may be scanned and re-optimized based on the new scan data and information about the source log, such as simulated orientation parameters, a 3D model, and/or potential cut solutions. In other embodiments, data from multiple sensor types may be used in combination to detect splits in logs, cants, or both. Optionally, re-optimization and split detection techniques may be used in combination to improve wood volume recovery, value, and/or throughput speed. Re-optimization and/or split detection techniques may also be used to reduce the number of pieces cut that initially consume production resources but ultimately become waste.

Reoptimization

In various embodiments, a primary breakdown line may include a chipper for chipping a log into a cant, a first scanner optimizer system with sensors arranged to form at least a first scan zone upstream of the chipper, and a second scanner optimizer system with geometric sensors arranged to form at least a second scan zone between the chipper and a downstream cutting device, such as a profiler or a saw. Additional scan zones may be provided upstream and/or downstream of the chipper in some embodiments.

The geometric sensors may be laser profile sensors or any other type(s) of sensor configured to measure the three-dimensional (3D) profile of the log or cant. The geometric sensors of the first scan zone (upstream of the chipper) may be positioned above and to each lateral side of the feed path to measure points along the upper and lateral sides of the log. In some embodiments one of the geometric sensors may be positioned below the feed path to scan the bottom of the log. Alternatively, the log may be rotated within the view of at least one of the geometric sensors to obtain data from the bottom of the log. The geometric sensors of the second scan zone (downstream of the chipper) may be positioned to scan the cut faces of the cant.

The first scanner optimizer system may scan the log upstream of the chipper and generate a 3D model of the log based on the scan data. The first scanner optimizer system may use the 3D model of the log to determine a desired rotational angle of the log. The system may also use the 3D model of the log to simulate processing the log in a number of different orientations, each with a different combination of horizontal and vertical skew and offset. The best of each parameter may be selected and captured during the optimization process.

At each simulated orientation, the system may simulate cutting the log into various center cant and side board combinations. The combinations to be evaluated may be determined by a log breakdown rule, which may be chosen based on user inputs such as species, grade selections, and log features (e.g., diameter, length, sweep). Thus, the first scanner optimizer system may simulate and assess a number of potential cut solutions for the log.

The first scanner optimizer system may select one of the cut solutions (the 'optimized cut solution') for implementation based on one or more factors such as projected value, risk (e.g., predicted stability of the log on a sharp chain), processing cost, and/or throughput speed.

The first scanner optimizer system may associate the 3D model, optimized cut solution, selected orientation parameters, and/or other data (e.g., non-selected orientation parameters, non-selected cut solutions, log breakdown rule, user inputs, scan data, etc.) with a corresponding log record in a queue.

The log may be turned and positioned according to the selected orientation parameters, and chipped into a cant according to the optimized cut solution.

In some embodiments, the second scanner optimizer system may scan the chipped face(s) of the cant between the chipper and the downstream profiler or saw. The second scanner optimizer system may transform the scan data from the second scan zone to the same reference frame (e.g., skew, offset, etc.) as the original 3D model of the log to generate a rescan 3D model of the cant.

The second scanner optimizer system may use the information about the log (e.g., the original 3D model of the log, the selected orientation parameters, optimized cut solution) and the rescan 3D model of the cant to reassess or recalculate the optimized cut solution for the cant or for some portion thereof. In some embodiments, the second scanner optimizer system may reassess the predicted side boards without reassessing the center cant. Using existing information to reoptimize the cut solution for the cant may enable reoptimization of the cant in a shorter time and with less processing power (and fewer sensors) than would be required to generate an entirely new 3D model using only the cant scan data.

For example, instead of calculating the geometry/dimensions of the cant from the rescan data, the second scanner optimizer system may assume that the cant has the geometry/dimensions defined by the original cut solution (if the cant is four-sided), or the geometry/dimensions defined by the original cut solution and 3D model of the log, collectively (if the cant is not four-sided). Likewise, instead of simulating and selecting orientation parameters for the cant, the second scanner optimizer system may use the orientation parameter(s) previously selected for the log.

In some embodiments, the second scanner optimizer system may use the rescan 3D model to re-optimize both the center cant portion and the side board portion of the optimized cut solution. This may help to offset position/cutting errors, accommodate defects revealed by the chipper, and/or relieve backups at other machine centers (e.g., by eliminating a side board after detecting a defect that might cause the side board to break and jam machinery, or by engaging profilers to profile side boards in response to a backup at the edger). Using the previously determined geometry/dimensions and orientation parameters may allow the second scanner optimizer system to modify or recalculate the cut solution without repeating all of the operations of the original optimization process.

In other embodiments, the second scanner optimizer system may assume that the center cant portion of the optimized cut solution is the best solution for cutting the center boards, and use the rescan 3D model to re-optimize only the side board portion of the optimized cut solution. Using parameters and solutions calculated for the log and re-optimizing only the side board portion of the cut solution may enable the system to adjust the cut solutions more rapidly, which may allow for faster processing of logs along the primary breakdown line. For example, if the optimized cut solution defines a side board to be profiled and cut from the cant, the system may use the rescan 3D model to determine whether to profile a different side board, or the same side board in a different position, or no side board at all, and the profilers may be adjusted accordingly if necessary. Similarly, if the optimized cut solution defines a flitch to be cut from the cant, the optimizer may use the rescan 3D model to determine whether to change the size or position of the flitch (e.g., cut the flitch from the opposite side) or eliminate the flitch. In either case, the re-optimized cut solution may define a different side board/flitch, but the same center cant and center boards, as the original optimized cut solution.

In still other embodiments, the optimizer may be configured to determine whether to use the log data/model or to use the cant data/model for various parts of the re-optimization. For example, the optimizer may compare the width or other dimension(s) of the actual cant to the width or other dimension(s) of the predicted cant defined by the optimized cut solution. If the optimizer determines that the difference does not exceed a predetermined threshold, the optimizer may use the original cut solution, orientation parameters, etc. to re-optimize the cant. If the optimizer determines the difference does exceed the threshold, the optimizer may use the cant data/model to recalculate any or all of those parameters.

Split Detection

In some embodiments, one or more of the scan zones may further include vision sensors (e.g., color vision cameras). Vision sensors upstream of the chipper may be positioned to capture greyscale or color images of the longitudinal outer surface of the log. Optionally, additional vision sensors upstream of the chipper may be positioned to capture images of the leading and lagging ends of the log. Again, at least one of the vision sensors may be positioned below the feed path (e.g., in a gap between conveyors), or the workpiece may be rotated in the field of view of a vision sensor above or to one side of the feed path, to obtain an image of the bottom of the workpiece. A pair of vision sensors may be provided downstream of the chipper in the second scan zone and positioned to scan the cut face(s) of the cant.

The data from the geometric sensors and the vision sensors may be processed to detect splits in the workpiece. The profile data from the geometric sensors may be processed to generate a 3D geometric model of the log generally as described above. The vision images of the ends of the logs may be processed by generating polygons that represent the outlines of each of the workpiece ends, including any surface splits found in the images. The profile data from the geometric sensors and the vision data from some or all of the vision sensors may also be processed collectively, by mapping the vision data to the geometric data or geometric model of the workpiece, to generate a 3D model that includes both geometric and vision data. In some embodiments, creating a 3D model may include processing the vision/geometric data to filter out noise.

Optionally, the 3D model of a log or cant may be displayed in a 2D "unfurled" configuration, as if the surface of the 3D model were cut longitudinally and flattened into a four-sided polygon such that the edges of the 'cut' are the opposite longitudinal edges of the polygon. This may allow an operator to see the entire surface of the log or cant on a single screen, as opposed to multiple screens.

One or more of the 3D models may be processed to search for indentations that are statistically significant in terms of length, depth, and/or other measured characteristics. In some embodiments, the geometric model may be used to estimate the length and/or depth of detected splits, and the vision data (e.g., in the form of pixel values and/or color) or the model may be used to verify or adjust the estimated measurements of the detected splits. The optimized cut solution for the log may be calculated based at least in part on the detected splits.

Reoptimization and Split Detection in Combination

In various embodiments, split detection and optimization techniques as described herein may be applied to logs, to cants, or to both.

In some embodiments, a log may be scanned in a primary scan zone with both geometric sensors and vision cameras.

In addition to generating a 3D model of the log, the scan data may be used to detect splits exposed on the surface of the log. The scanner optimizer system may assess the 3D model in various orientations, each with a corresponding set of parameters (e.g., vertical/horizontal skews, offsets, rotational positions), and select the best choice from each simulated parameter in terms of value, recovery, desired products, and/or throughput speed. Again, at each simulated orientation the system may simulate cutting the log into various center cant and side board combinations selected based on a log breakdown rule, and select one of the cut solutions as the 'optimized cut solution' based at least in part on the split data (e.g., to minimize the impact of the split on cut products/profitability). If the detected split is deeper or wider than a predetermined cutoff value, or the optimizer or operator determines that the log is not worth processing, the log may be kicked off the line.

The cant may be scanned downstream of the chipper, and the new scan data may be assessed to detect splits and other defects that were not previously visible or that were over- or under-estimated based on the log scan data. If the detected defects are determined by the optimizer and/or the operator to exceed a particular threshold, the cant may be kicked off the line. Otherwise, the defect information obtained from the cant may be used to reassess the optimized cut solution, as well as potential cut solutions that were calculated but not selected (e.g., cut solutions with the same center boards but different side cuts), to determine whether one of the other cut solutions should be implemented instead. This may allow the operator to recover more value from logs and cants with splits that are revealed by chipping the log into a cant.

Reoptimization and split detection techniques as described herein may be applied individually or in any suitable combination. For example:

the log may be analyzed for splits without analyzing the cant for splits or reoptimizing the cant;
the cant may be analyzed for splits without analyzing the log for splits or reoptimizing the cant;
both the log and the cant may be analyzed for splits without reoptimizing the cant;
the log may be analyzed for splits, and the cant may be reoptimized without analyzing the cant for splits;
the cant may be analyzed for splits and reoptimized without analyzing the log for splits;
both the log and the cant may be analyzed for splits and the cant may be reoptimized.

Thus, while reoptimization techniques and split/defect detection techniques are described in combination herein by way of illustration, those with ordinary skill in the art will readily appreciate that any or all of the techniques and operations may be used separately, and such embodiments are within the scope of the present disclosure.

Turning now to the figures, FIG. 1 is a schematic diagram of a lumber processing system 100, in accordance with various embodiments. Lumber processing system 100 may include a primary breakdown line 100a and a scanner optimizer system 100b.

Primary breakdown line 100a may include a transport system 108 and one or more cutting devices such as chipper 112, profiler 114, and saws 116 arranged along transport system 108. Primary breakdown line 100a may further include a log turner 114 upstream of the cutting devices. A transport system 118 with one or more conveyors may be positioned along the primary breakdown line to convey flitches and/or side boards to an edger, trimmer, or other machine center(s) of a secondary breakdown line (not shown).

In various embodiments, profiler 114 may be a conventional profiler. Profiler 114 may include one or more profiling units, with any suitable number and type of profiling heads, in any suitable arrangement or configuration. Optionally, profiler 114 may be a skewing/slewing profiler. Some embodiments may have multiple profilers 114 (see e.g., FIG. 4C, profilers 114a and 114b).

In other embodiments, a second chipper may be provided instead of, or in addition to, profiler 114. For example, chipper 112 may be a side chipper (to chip flat faces along opposite sides of the log), and the second chipper may be a top/bottom chipper. Alternatively, the second chipper may be another side chipper, and a cant kicker/turner may be provided between chipper 112 and the second chipper to turn the cant 90 degrees.

Other embodiments may lack profiler 114. For example, a primary processing line that cuts flitches from logs and does not profile side boards may lack profiler 114.

Transport system 108 may be configured to convey logs/cants in a flow direction into or through the cutting devices. In various embodiments, transport system 108 may be a conventional conveyor/transfer system with any suitable number and combination of transfers, conveyors, positioning devices (e.g., feed rolls, positioning pins/rolls, hold down rolls, lifts, skids/pans, ramps, etc.), and the like. For example, in some embodiments transport system 108 may include an autorotation conveyor, a second conveyor operable to skew and slew the log while feeding the log into chipper 112, and a sharp chain conveyor operable to reposition the resulting cant while feeding the cant into saws 116.

Log turner 110, chipper 112, and saws 116 may also be conventional devices. For example, log turner 110 may be a roll-type, ring-type, sharp chain-type, rotary, knuckle, or other type of turner. Chipper 112 may have one or more conical, drum-style, or other type of chip heads. Optionally, chipper 112 may be a chipper-canter (e.g., a vee chipper-canter, horizontal chipper-canter, or vertical chipper-canter). In some embodiments, chipper 112 may instead be a saw center (e.g., a pair of band saws or circular saws) operable to open flat faces along the log. Saws 116 may include one or more band saws and/or circular saws. The number, type, and arrangement of the transfer systems, cutting devices, and other such components may vary among embodiments. Some embodiments may include multiple saws 116 spaced apart along the path of flow to enable cutting of side boards and/or flitches at multiple locations along the primary breakdown line (see e.g., FIG. 4C, illustrating saws 116a downstream of a first profiler 114a and saws 116b downstream of a second profiler 114b). In some embodiments the primary breakdown line may further include a gang saw 134 (FIG. 4C).

In various embodiments, the scanner optimizer system 100b may include one or more sensors 102 and one or more computer systems operatively coupled with sensor(s) 102. For example, sensors 102 along a first portion of the flow path (e.g., upstream of chipper 112) may be coupled with a first computer system 106, and other sensors 102 along another portion of the flow path (e.g., downstream of chipper 112) may be coupled with a second computer system 124. Optionally, the scanner optimizer system may further include a third computer system 126 operatively coupled with, and configured to process data from, computer system(s) 106/124.

Sensors 102 may be configured to measure the geometric profile of the log. In some embodiments, some or all of sensors 102 are digital laser profile sensors. Preferably, the sensors 102 are configured to acquire scan images, process the images, filter the image data and convert it to dimension (X-Y) coordinates. Examples of suitable sensors 102 include, but are not limited to, USNR Smart TriCam lineal sensors and USNR LPL/LPLe sensors.

Sensors 102 may be arranged to form one or more scan zones upstream of the chipper 112. In some embodiments sensors 102 are arranged to form at least one scan zone upstream of the log turner 110 and an additional scan zone adjacent to the log turner 110 (e.g., to detect the log while the log is being turned). Other embodiments may have only one scan zone (e.g., upstream of the log turner). Still other embodiments may have two scan zones, three scan zones, or four or more scan zones in various locations upstream of the chipper 112. Optionally, a scan zone may have multiple sub-zones, each with a corresponding group of sensors, that are spaced apart along the path of flow such that each group scans a corresponding portion of the log.

In some embodiments the first scanner optimizer system may also include sensors 104a and/or 104b. Sensors 104a and 104b may be (or may include) vision cameras. An example of a suitable sensor 104a/104b is the USNR BioLuma 2900V sensor. However, sensors 104a/104b may be any type of sensor configured to capture vision images at sufficient resolution. Sensors 104a may be positioned around the flow path to capture images of the longitudinal outer surfaces of the logs upstream of chipper 112. Sensors 104b may be positioned above or to the side of the flow path and angled toward the flow path to detect the ends of passing logs. Other embodiments may lack sensors 104a/104b. Optionally, some or all of the sensors may be set at angles such that each side of the log is scanned by two sensors from different angles.

Figure 4A:
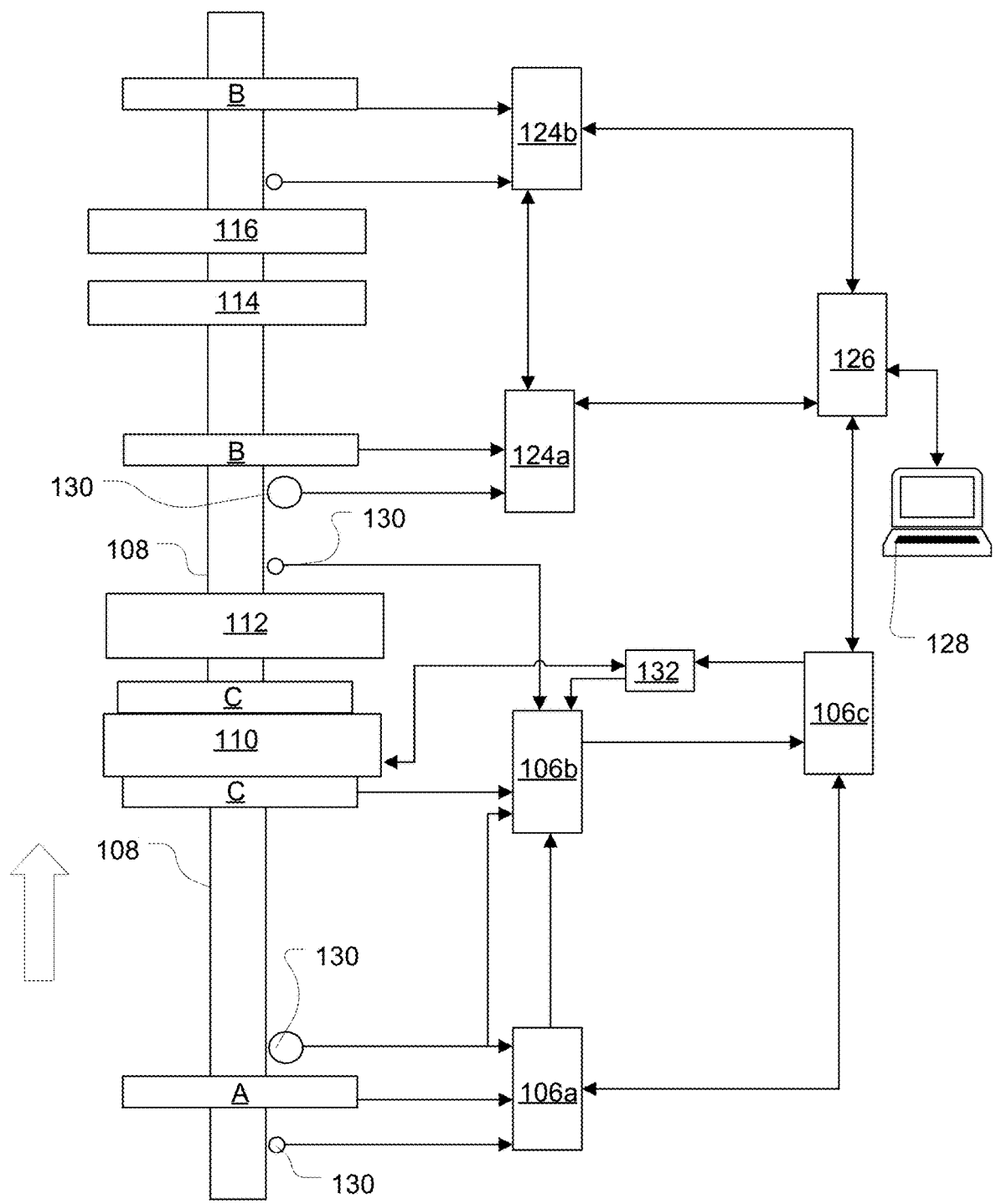
FIGS. 4A-4C illustrate schematic views embodiments of primary breakdown lines.
Figure 4B:
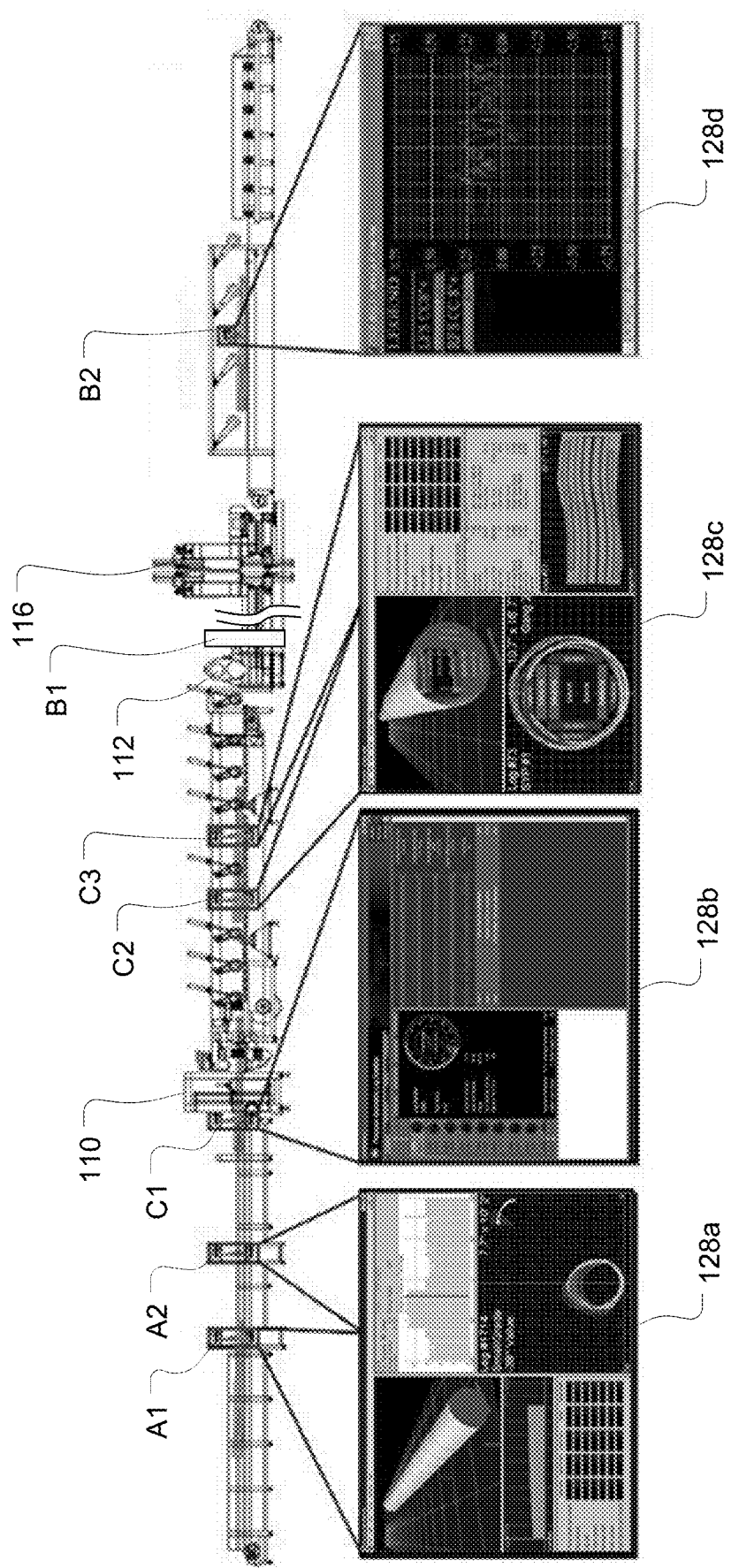
Figure 4C:
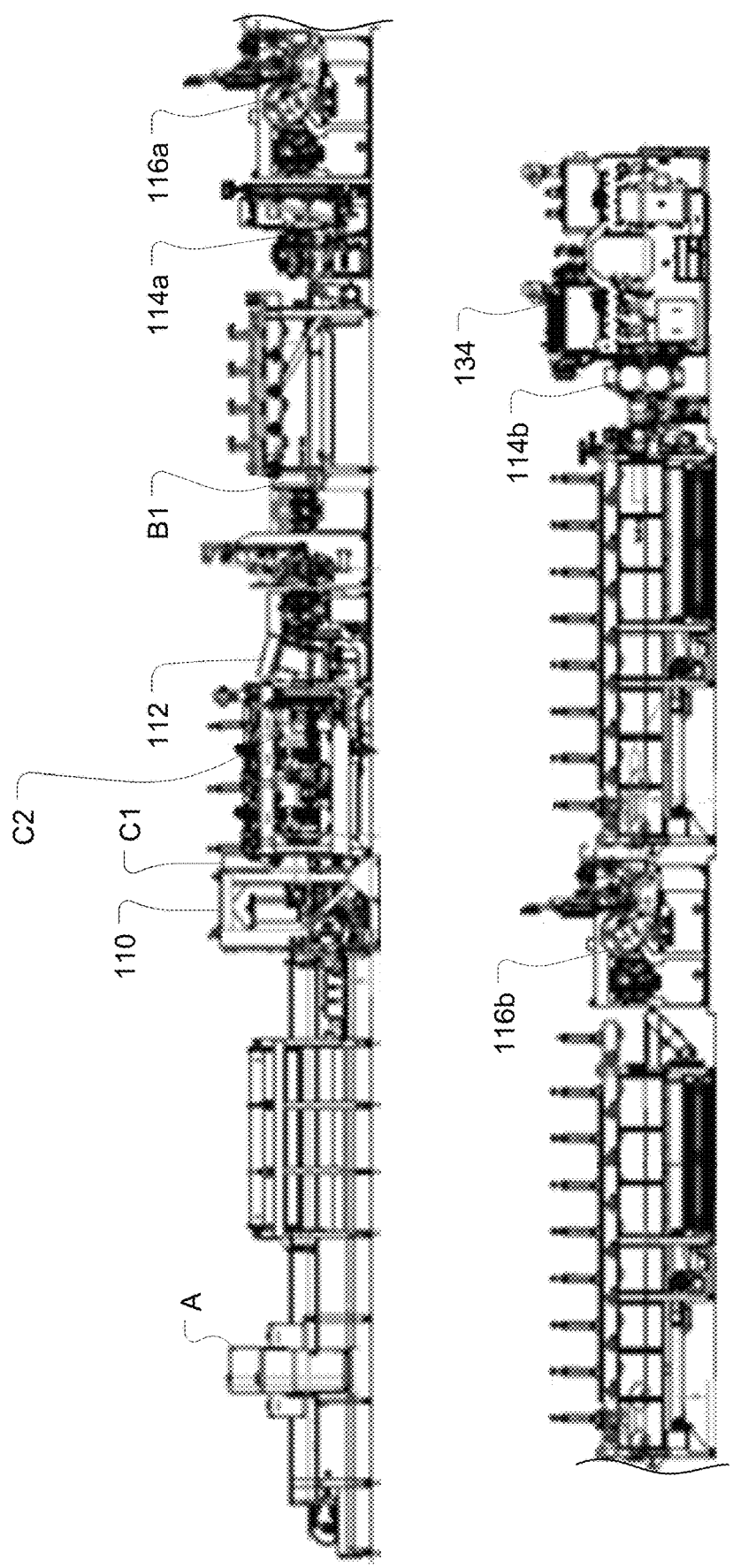

Referring now to FIGS. 4A and 4B, in various embodiments sensors 102 may be arranged to form a first scan zone A upstream of the log turner 110 and a second scan zone B downstream of chipper 112. Optionally, the first scan zone A may include two or more sub-zones, each with a corresponding group of sensors, such that each sub-zone scans part of the log. The second scan zone B may be between the chipper 112 and profiler 114, or downstream of saws 116, or second scan zone B may include a scan zone in each of those two locations. Optionally, additional sensors may be arranged to form another scan zone adjacent to the log turner 110 (scan zone C). Again, any or all of these zones may include multiple sub-zones.

Figure 2A:
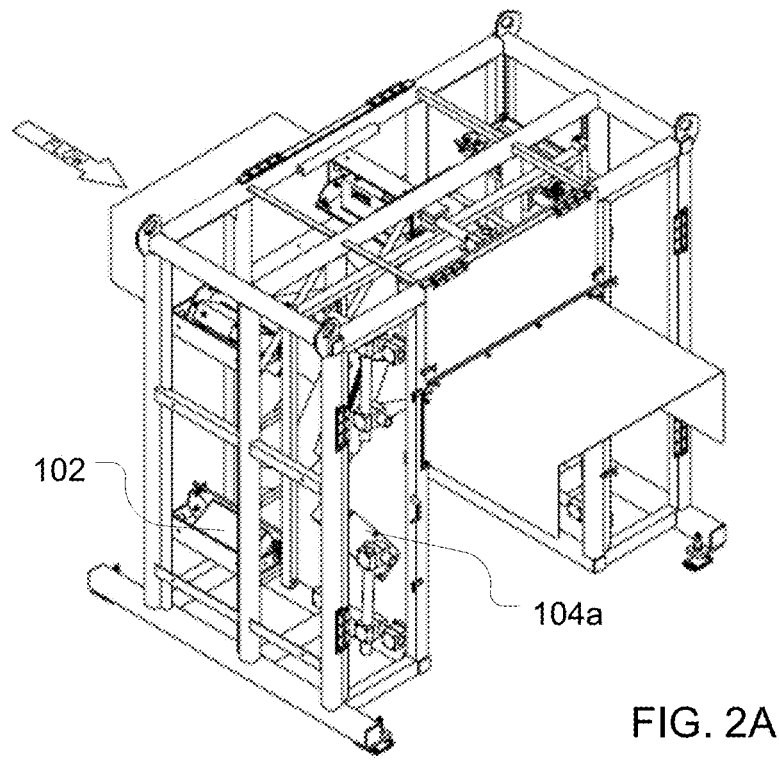
FIGS. 2A-2C illustrate schematic views of sensor arrangements in a first scan zone, or sub-zone(s) thereof.
Figure 2B:
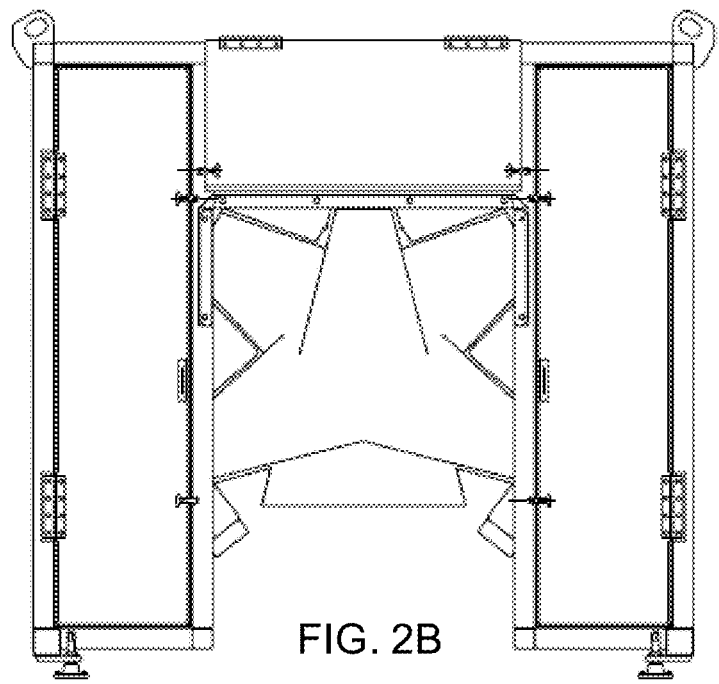
Figure 2C:
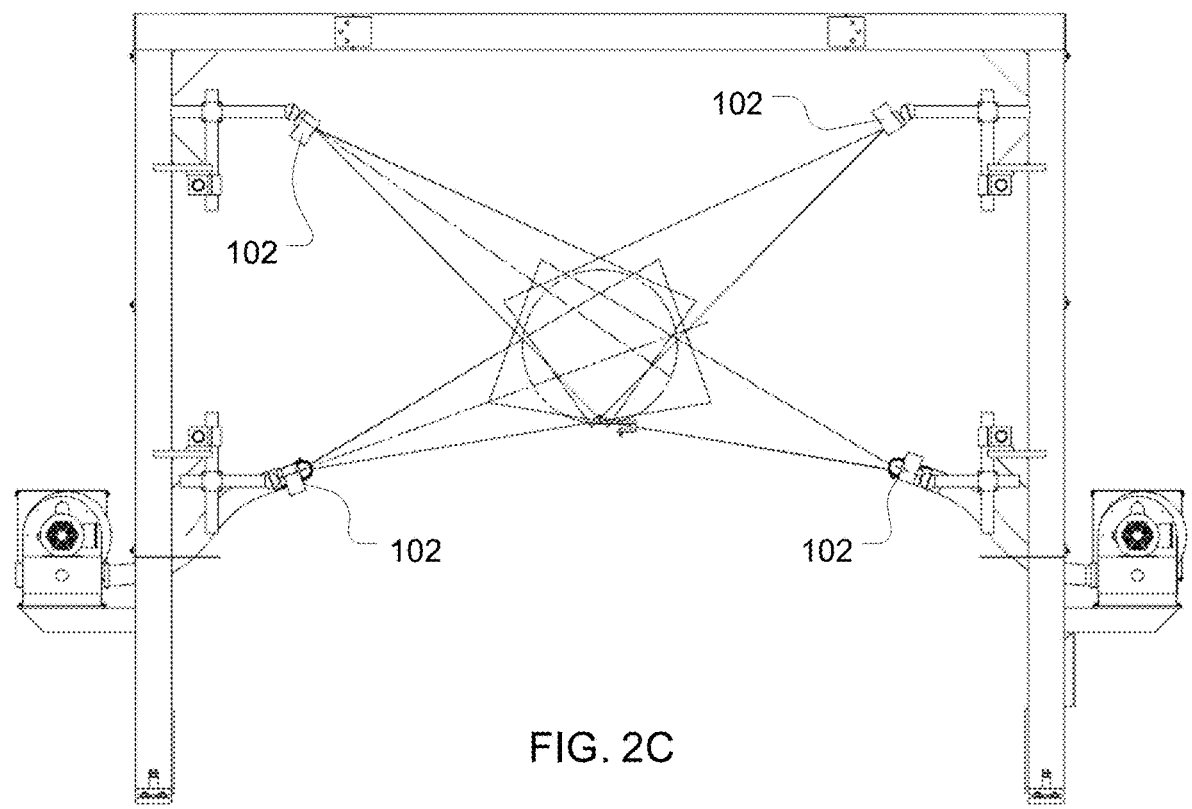
Figure 3A:
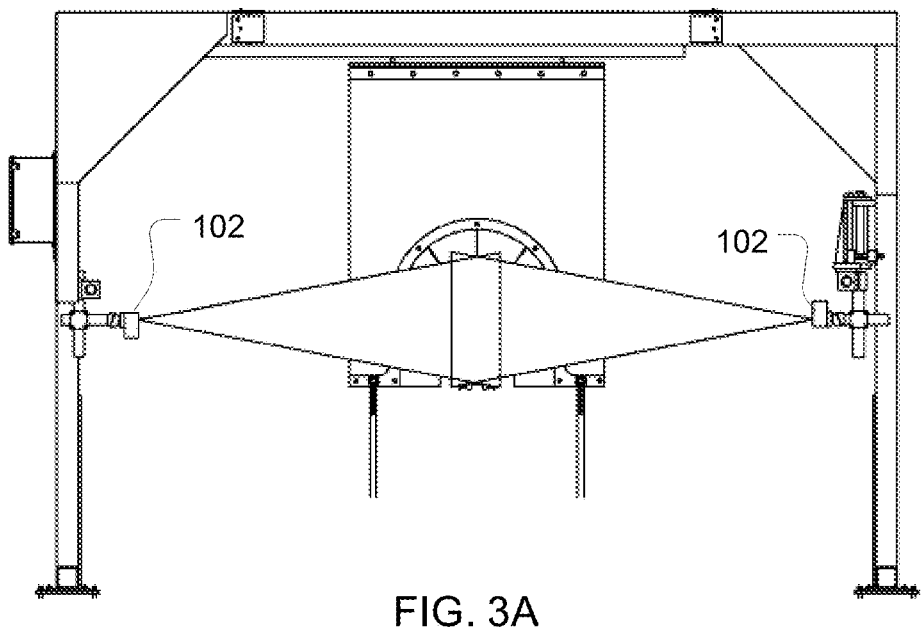
FIGS. 3A-3B illustrate schematic views of sensor arrangements in a second scan zone, or sub-zone(s) thereof.
Figure 3B:
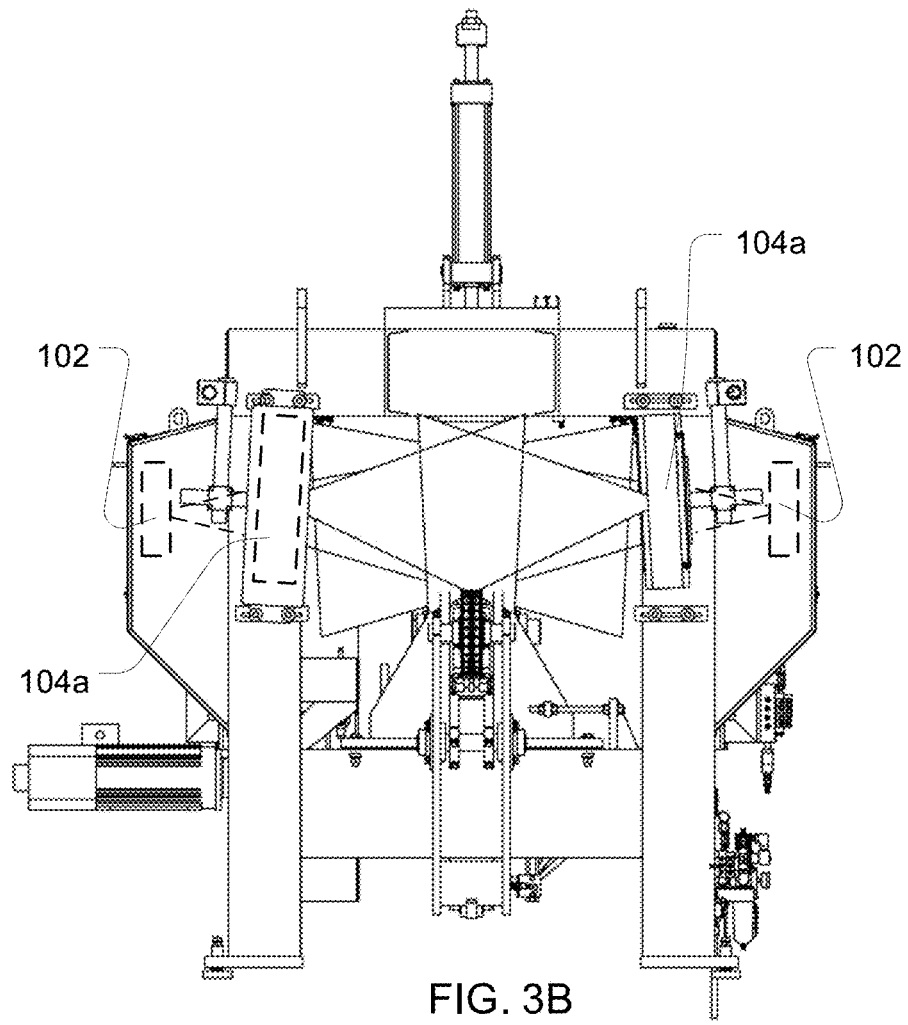

The first scan zone A may include four or five sensors 102 arranged around the path of flow (FIGS. 2A-2B). Optionally, the first scan zone may further include four or five sensors 104a arranged around the path of flow (FIGS. 2A, 2B) and/or two sensors 104b arranged above and/or below the path of flow to scan the leading and lagging ends of the logs (see e.g., FIG. 1). The second scan zone B may include two sensors 102 positioned on opposite sides of the path of flow (FIG. 3A). Optionally, the second scan zone B may further include two sensors 104a similarly positioned on opposite sides of the path of flow (FIG. 3B). Again, in some embodiments one such sensor arrangement may be provided between chipper 112 and profiler 114, and another such sensor arrangement may be located downstream of the saws 116 (e.g., upstream of a gang saw) to scan the cut faces of the cant 12 and the remaining center cant 14, respectively. Scan zone C, if present, may include four or five sensors 102 (and optionally, four or five sensors 104a) arranged around the path of flow (see e.g., FIG. 2A-C). Again, other embodiments may have only one or two scan zones upstream of chipper 108. Any or all of the scan zones may further include other sensors, such as X-ray, ultrasound, microwave, or other types.

The sensors of the first scan zone A may be operatively coupled to first computer system 106, and the sensors of the second scan zone(s) B may be operatively coupled to second computer system 124. The sensors of scan zone C, if present, may be operatively coupled to either or both of computer systems 106/124. Optionally scan zone C may include a sub-zone proximal to the log turner 110 (see e.g., FIG. 4B, scan zone C1) and one or more sub-zones between log turner 110 and chipper 112 (see e.g., FIG. 4B, scan zones C2 and C3). In such embodiments, the sensors of the sub-zone proximal to the log turner may be operatively coupled with either the first computer system 106 and/or an additional computer system 126. In some embodiments some or all of the computer systems may be integrated within a single computer. Alternatively, each computer system may include a single computer configured to process data from all of the corresponding sensors. In other embodiments, one or more (or all) of the computer systems may include multiple computers. Optionally, at least one of the computer systems may include two or more computers coupled with corresponding groups of the sensors (e.g., corresponding sub-zones), and at least one additional computer that receives and processes data from the other computers.

In some embodiments, as shown for example in FIG. 4A, computer system 106 may include computer(s) 106a operatively coupled with the sensors of the first scan zone A. Computer(s) 106a may be configured to generate a three-dimensional (3D) model of the log based at least on the scan data from the corresponding sensors 102. For example, computer(s) 106a may receive log position data from a position indicator 130 (e.g., an encoder, photo-eye, light curtain, vision camera, etc.) and assemble the x, y coordinates from sensors 102 into corresponding sections spaced along the z axis to form the 3D model. Computer(s) 106 may also be configured to determine an optimized rotational position for the log based on the 3D model.

If scan zone C is present, computer system 106 may include computer(s) 106b operatively coupled with the sensors 102 proximal to the log turner. Computer(s) 106b may be configured to monitor (and optionally, to correct) the rotation of the log during/after the turn(s). For example, computer(s) 106b may be operatively coupled with a control system 132 that includes one or more controllers (e.g., PLC(s)) and may receive log data, such as the 3D model of the log and the optimized rotational position for the log, from computer(s) 106a. The computer(s) 106b may determine the actual rotational position of the log in the log turner, based on data from the corresponding sensors, and compare the actual rotational position to the optimized rotational position and/or the rate at which the log turner is rotating the log. Based on the comparison, the computer(s) 106b may send instructions to the control system 132 to cause the log turner to adjust the rate/direction at which the log is being turner, and/or adjust the log skew/offset position, to achieve the optimized rotational position.

If scan zone C includes another sub-zone(s) between the log turner and the chipper (e.g., sub-zones C2 and C3, FIG. 4B), the sensors of those sub-zones may be operatively coupled with computer(s) 106c. Computer(s) 106c may be configured to determine an optimized cut solution for the log based at least on the sensor data. In some embodiments computer(s) 106c may be configured to receive log data (e.g., 3D log model, optimized log rotation/position, split/defect data) from computer(s) 106b/106a and to determine an optimized cut solution for the log based at least in part on the log data. Alternatively, all of the sensors of scan zone C may be operatively coupled with computer system 106b, and computer system 106b may be configured to determine the optimized cut solution based at least in part on the scan data from scan zone C and log data (e.g., a 3D log model, log position data, split/defect data, etc.) received from computer(s) 106a.

In a particular embodiment, the first scan zone A may have five LPL or LPLe sensors and five BioLuma 2900LV sensors (products of USNR) arranged around a flow path (e.g., around a USNR AutoRotation, or AR, conveyor). Scan zone C1 may include a USNR PGLR (progressive geometric log rotation) sensor system with four geometric LPLe sensors. Scan zone C2 may include two geometric LPLe sensors, and scan zone B (e.g., B1 and/or B2) may include two geometric LPLe sensors and two BioLuma 2900V sensors, disposed on opposite sides of the flow path.

In various embodiments, some or all of the computer systems may be configured to display at least some of the log data for viewing (e.g., on a computer monitor or other type of display) by a human operator. For example, as shown in FIG. 4B, computer 106a may display the 3D shape and optimized rotational position via user interface 128a, computer 106b may display the progress of the log rotation via user interface 128b, and computer 106c may display the optimized cut solution via user interface 128c.

In some embodiments, another computer system (e.g., third computer system 126) may receive the 3D geometric log/cant model and optimized cut solution from the first/second computer system, as well as log scan data from a corresponding scan zone. This computer system may be configured to compare the actual geometric characteristics of a workpiece to the predicted geometric characteristics of that workpiece (e.g., based on the 3D geometric log model and/or optimized cut solution), determine a difference(s) that reflects a positioning/cutting error, and report the determined difference (e.g., via a user interface display; see e.g., FIG. 4B, user interface/display 128d).

The third computer system may be configured to measure:
predicted vs. actual cant face measurements (e.g., on chip\chip face sets and saw\saw sets);
predicted vs. actual chip\saw set: if done on chip\chip face sets and/or saw\saw sets, this may be used to analyze saw and chipper calibration (e.g., if a saw set is predicted to be at +2" from the machine centerline and the sawn face is scanned at +2.02", the computer system may report that the saw or saw calibration is off by 0.02"); and/or
predicted vs. actual cant width: e.g., if the 6" cant width target is 5.875" and the cant width is scanned at 6", the computer system may report a 0.125" error, which may be used to adjust saws and chippers.

If the sensors of a scan zone include sensors 104a/104b, the corresponding computer system may optionally include an additional one or more computers operatively coupled with, and configured to process data from, those sensors. Alternatively, any or all of computers 106a, 106b, and/or 106c may process the data from sensors 104a/104b. In some embodiments computer system 106 may further include one or more additional computers configured to process data generated by some or all of the other computers (e.g., to integrate visual data with geometric data, to integrate defect data with 3D models, etc.).

In some embodiments, such as the embodiment of FIG. 4C, computer(s) 106a may be operatively coupled with the sensors of scan zone A and configured to generate the 3D model of the log, determine the optimized rotational position for the log, and determine the optimized cut solution for the log. In this embodiment the sensors of scan zone A may include four or five sensors 102 and four or five sensors 104*a*. Optionally, the sensors of this scan zone may further include two or more sensors 104*b* positioned to scan the leading and lagging ends of the log. As described above, computer(s) 106*b* may be operatively coupled with the sensors of scan zone C1 and configured to monitor and correct the rotation of the log in this embodiment. Scan zone C2 may include two sensors 102 positioned along opposite sides of the feed path and operatively coupled with computer(s) 106*c*, which may be configured to verify the actual rotation angle and position of the log, and/or to detect mechanical problems (e.g., incorrect positioning of feed/ positioning rolls) upstream based on a comparison of the actual rotation angle/position to information about the optimal rotation angle/position received from computers 106*a*/ 106*b*.

The second computer system 124 may be operatively coupled with sensors 102 of the second scan zone B located downstream of chipper 112. Scan zone B may be only one zone, or multiple sub-zones. In some embodiments scan zone B may include two sensors 102 positioned to scan opposite sides of the cant (see e.g., FIG. 3A). In some embodiments scan zone B (or a sub-zone thereof) may further include sensors 104*a*. For example, a pair of sensors 102 and a pair of sensors 104*a* may be positioned to scan opposite sides of the cant (see e.g., FIG. 3B).

Again, computer system 124 may include one computer or multiple computers. For example, computer system 124 may include a computer 124*a* that receives and processes data from the sensors of a sub-zone located between the chipper 112 and saws 116 (see e.g., FIG. 4B) or between chipper 112 and profiler 114 (see e.g., FIG. 4C). Optionally, computer system 124 may include another computer 124*b* that receives and processes data from sensors 102/104*a* of another sub-zone located downstream of saws 116 and/or from computer 124*a* and/or the first computer system 106 (e.g., to integrate visual data with geometric data, or integrate defect data with 3D models, etc.). Computer system 124 may receive log/cant position data from one or more position indicators 130 (e.g., an encoder, photo-eye, light curtain, vision camera, etc.). In some embodiments computer system 124 may be configured to re-optimize the cant and/or modify a portion of the cut solution (e.g., a side board portion of the cut solution) based on data from sensors of the second scan zone and data from the first computer system (e.g., 3D model of the log, optimized cut solution, actual rotational angle, actual log position, etc.). Optionally, first and second computer systems 106 and 124 may be in communication with third computer system 126. Again, third computer system 126 may be configured to analyze data received from the other computer systems and/or monitor equipment performance as described above.

Figure 5:
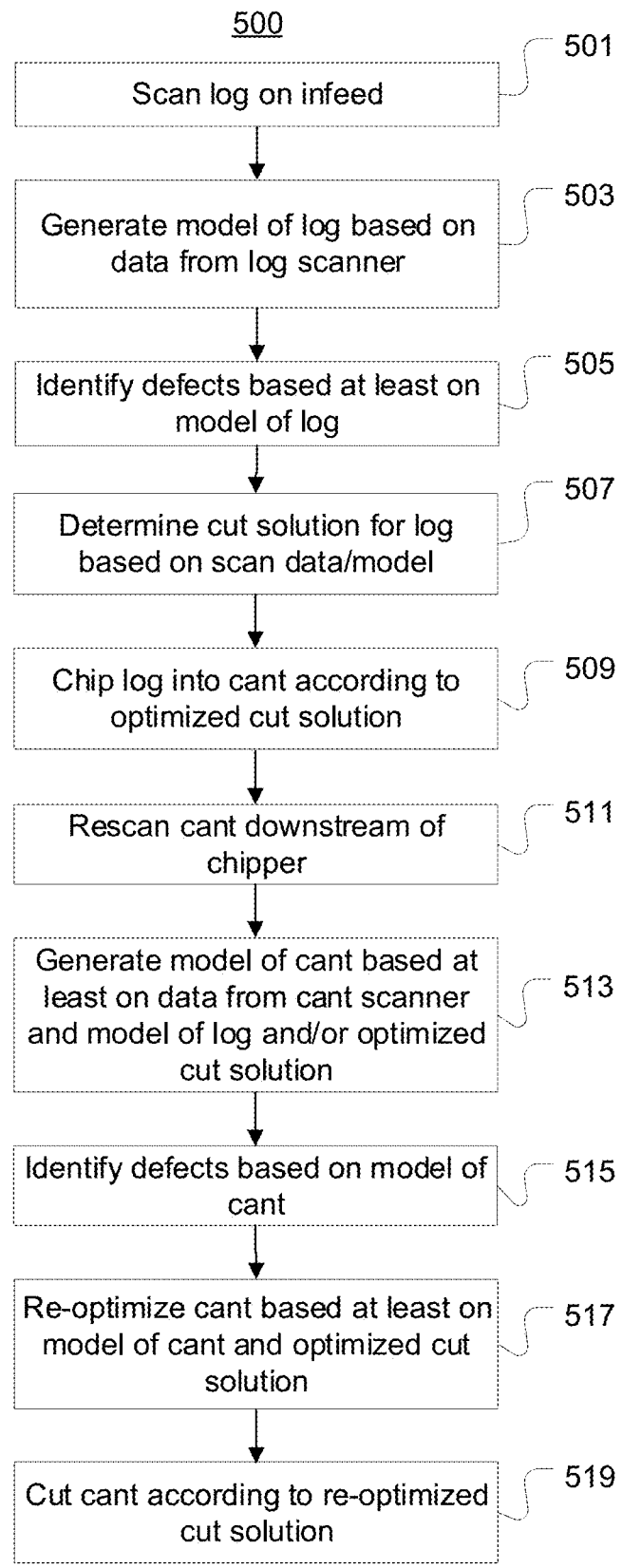
FIG. 5 illustrates a method of processing a primary workpiece.

FIG. 5 illustrates a method 500 of processing a log, and FIGS. 6-10 further illustrate operations of FIG. 5, in accordance with various embodiments.

At block 501, a log may be scanned on an infeed (e.g., transport 108) in a first scan zone (e.g., scan zone A and/or sub-zones A1, A2) upstream of a chipper (e.g., chipper 112) as the log is conveyed in the flow direction. At block 503, a first computer system (e.g., computer system 106) operatively coupled with the geometric sensors (e.g., sensors 102) of that scan zone may generate a 3D model of the log based on the scan data as described above. An example of a corresponding process flow 600 is illustrated in FIG. 6.

Referring now to FIG. 6, at block 601 the first computer system may receive a plurality of (x, y) coordinates from the geometric sensors of the first scan zone. Optionally, at block 603 the first computer system may determine, based on the coordinates, sets of data points that represent the outer surface of the log at corresponding fixed intervals along the z axis of the log. For example, the first computer system may assemble the received coordinates and extrapolate or interpolate to obtain sets of data points (x, y coordinates) that represent the outer surface of cross-sections of the primary workpiece at the same or different fixed intervals (e.g., every 4 inches) along the length (z-axis) of the log. Alternatively, in some embodiments the geometric sensors may capture profile data at the desired intervals along the log, and block 603 may be omitted. At block 605 the first computer system may combine the coordinates (if block 603 is omitted) or the data points (if block 603 is performed) to obtain the 3D geometric model of the log. Optionally, at block 607 the first computer system may associate the 3D model of the log with a corresponding log record in a queue.

Optionally, at block 505, the first computer system may identify defects in the log based at least on the 3D model. An example of a corresponding process flow 700 for identifying splits is illustrated in FIG. 7. In this process flow, the first computer system may detect splits based at least on geometric data from one or more geometric sensors. Optionally, vision data from one or more vision sensors may be used by the first computer system in addition to the geometric data to detect splits. In some embodiments, the first computer system may detect splits based at least on geometric data from four or five geometric sensors (e.g., sensors 102) arranged around the path of flow, and optionally four or five vision sensors (e.g., sensors 104*a*) arranged in the same or similar manner, to form a scan zone. Such an arrangement may help to increase the likelihood that at least one of the geometric sensors will be at an appropriate angle to scan an interior portion of the split, and/or that the vision sensors will capture images of the split from different angles. Alternatively, fewer sensors may be used (e.g., if detecting splits while the log is being rotated). Further, while vision data may not be used in the detection of splits in some embodiments, the use of vision data may help to improve split detection. For example, splits may open and close depending on the moisture content of the log, so vision sensors may sometimes detect a split (e.g., as a black line) that would be missed or under- or over-estimated based solely on geometric data.

Figure 11:
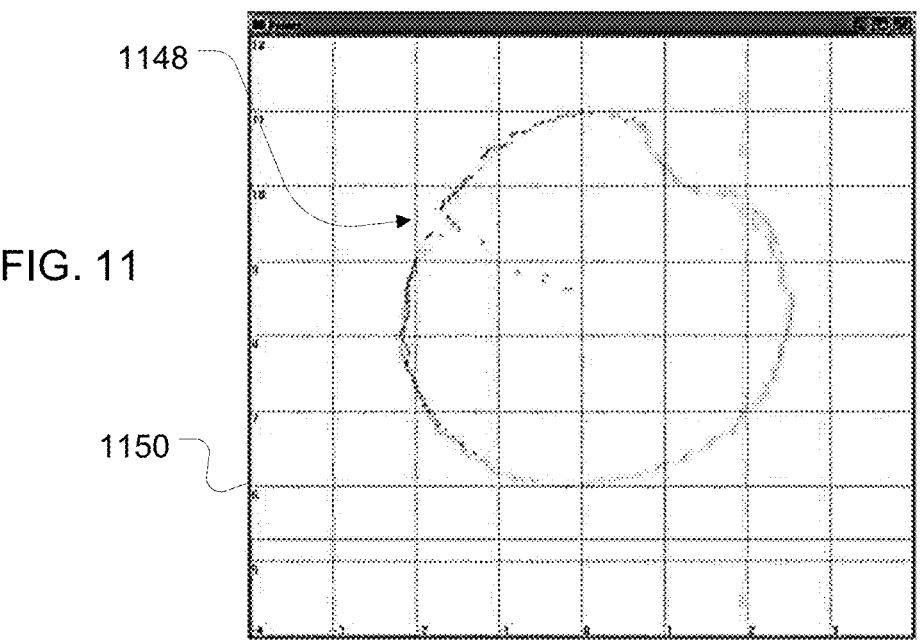
FIG. 11 illustrates a cross-section of a 3D log model with a detected split.

Referring now to FIG. 7, at block 701 the first computer system may analyze the 3D geometric model of the log to identify a statistically significant indentation, if any, that represents a split. In some embodiments splits may be modeled as pie shaped defect zones piercing from the surface to the geometric center of the log at each segment that includes a portion of the detected split. At block 703, the first computer system may determine the dimensions and angle of the split at each of those cross sections. FIG. 11 shows a user interface/display 1150 with a representation of a cross-section of a 3D log model with a split 1148. In some embodiments, using data from the surface of the log instead of the ends of the log may allow the detection of splits that run for only a portion of the log length and/or more accurate modeling of the size and angle (spiral) of the split. At block 705, the first computer system may associate the determined dimension and angle values with the corresponding log record in the queue.

Optionally, at block 707, the first computer system may map vision image data to the geometric model and associate the combined model with the corresponding log record. In some embodiments the vision image data may be mapped to the geometric model by aligning the edges of the images and stretching one or both images as necessary to match all of the edges. This method may be used, for example, if fewer than four geometric and four vision sensors are used to form the scan zone. In other embodiments, such as those in which five of each sensor type are used to form the scan zone, each pixel may be treated as a vector emanating from the lens, and the computer system may find the intersection of the pixel with the geometric sensor to map the vision data to the geometric data. Aligning the geometric data and the vision data allows the data to be analyzed together to improve the detection and confidence in the results. Optionally, the vision data may be superimposed on the 3D geometric model to generate (and optionally, to display to an operator) a combined 3D model of the log and/or defects thereof.

Figure 10:
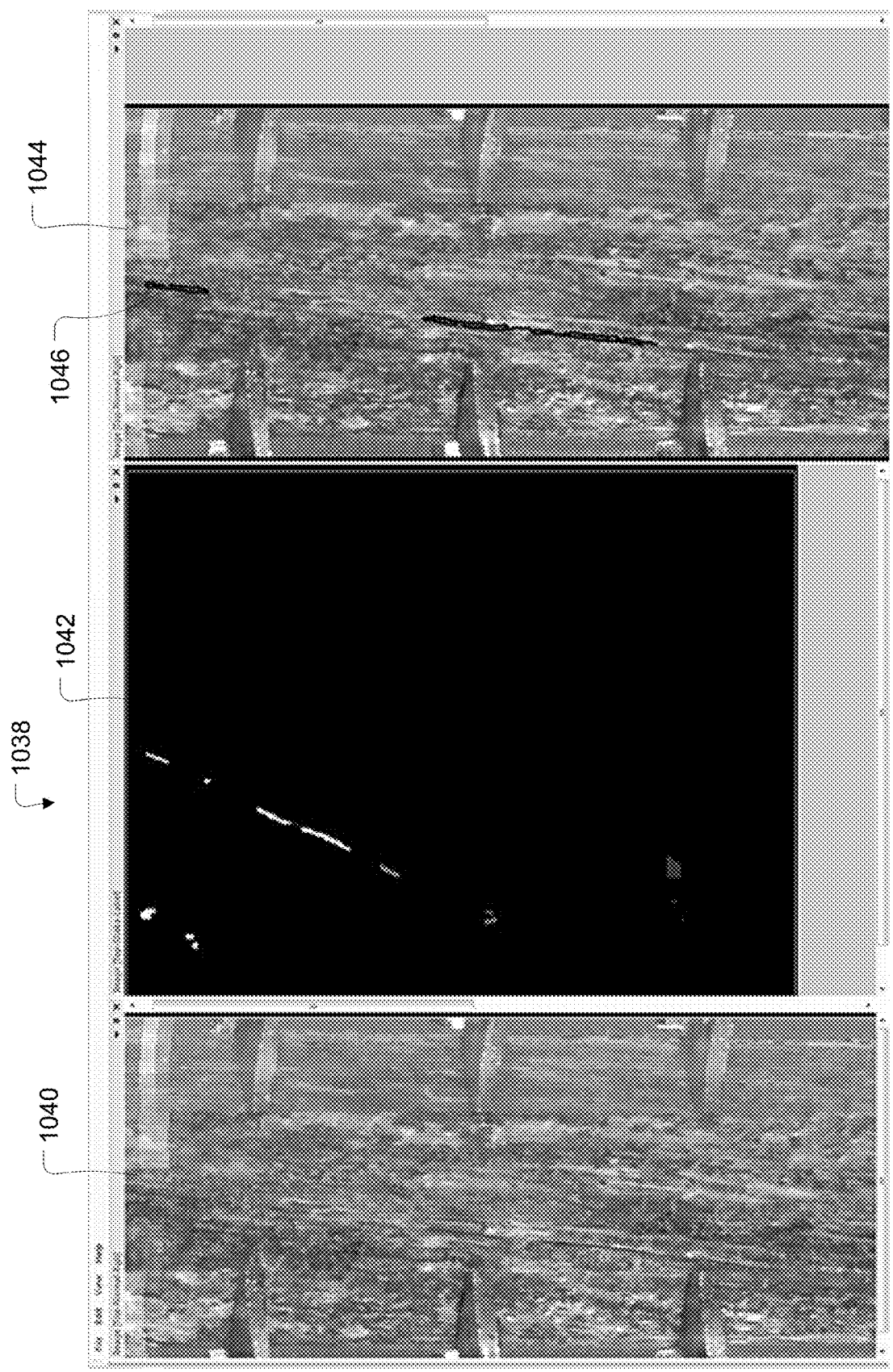
FIG. 10 illustrates a user interface showing split detection relative to an unfurled log model.

In various embodiments, the computer system may use a conventional edge detection process to detect the edges of regions within a vision image (e.g., by detecting changes in color that exceed a minimum threshold). Such methods are well known. The computer system may filter the image data to identify regions of interest (e.g., based on pixel color value that exceeds a predetermined threshold) and calculate the length and width of the region. Optionally, the computer system may compile the image data from multiple vision sensors into a 3D vision image of the log. The computer system may also convert the 3D vision image to a flat 'unfurled' image of the log (i.e., as if a cylindrical image of the log were sliced longitudinally to produce a flat image, with the portions of the image along both sides of the 'slice' now opposite edges of the flat image). FIG. 10 illustrates an example of a corresponding user interface/display 1038. The first image 1040 shows an unfurled image of a log on a flighted chain. In this image, the longitudinal 'slice' is through the centers of the flights, such that opposite sides of each flight appear on opposite sides of the image. The second image 1042 shows detected regions of interest (highlighted areas), and the third image 1044 shows the detected regions of interest 1046 superimposed on the first image.

Optionally, the computer system may be provided with a training set or rules for distinguishing between defects and non-defect areas. In various embodiments, a plurality of logs (or other pieces of wood to be analyzed) may be scanned and the image data compiled into 3D, unfurled, or other visual representations of the pieces of wood. A human operator may indicate the regions of interest that correspond to an actual defect, such as a split, knot, stain, or the like, to build a set of defect data. The defect data may be compared to non-defect data to identify common characteristics of a given type of defect (e.g., pixel color, minimum/maximum dimensions of the defect, etc., and these characteristics may be used to determine rules and/or set parameters according to which the computer system can automatically distinguish between regions of interest that correspond to defects and those that do not. A similar process may be used to provide the computer system with a training set and rules/parameters for edge detection.

In some embodiments, the first computer system may combine or superimpose the split/defect data onto the 3D log model (e.g., the 3D geometric model, the 3D vision model, or a combined 3D geometric and vision model). Regardless, the first computer system may associate the additional information (e.g., the 3D vision model/unfurled model of the log and the defect data) with the corresponding log record.

While this particular example relates to split detection, it is to be understood that the same or similar methods and process flows could be used to identify other defects, such as knots, stain, and the like, using geometric and/or vision cameras.

Referring again to FIG. 5, at block 507 the first computer system may determine an optimized cut solution for the log based at least on the 3D model and/or scan data. The optimized cut solution may define the predicted products to be cut from the primary workpiece, which may include one or more predicted flitches/side boards, and the predicted cut line(s) along which the log is to be cut to obtain the predicted products. In some embodiments the first computer system may determine a saw set for positioning the chipper(s)/saw(s) that will be used to cut the log, and the saw set may be considered part of the optimized cut solution. Optionally, the predicted cut lines may be defined by the saw set, in which case the saw set may be considered part of the optimized cut solution. Alternatively, the predicted cut lines may be represented by lines or planes incorporated into, or displayed relative to, the 3D model of the primary workpiece (see e.g., FIG. 4a, user interface 128c). In some embodiments the first scanner optimizer system may generate positioning instructions for use by a controller, such as a programmable logic controller (PLC), to position the chippers, profilers, and/or saws to cut the log according to the optimized cut solution. The first scanner optimizer system may also generate positioning instructions for use by the log turner and/or other positioning equipment to move the log to the optimized position for cutting.

The optimized cut solution may be determined in any suitable manner. In some embodiments, the first computer system may determine an optimized rotation angle (and optionally a desired skew/offset) by simulating a variety of possible orientations for the log and selecting a 'best' orientation based on any one or more of a variety of factors, such as predicted stability on a downstream conveyor (e.g., a sharp chain conveyor), detected defect information, and/or potential cut solutions that could be implemented. For example, the first computer system may use the 3D model of the log to determine the optimized rotation angle by first considering the overall shape of the log, which affects the stability of the log in a given orientation (e.g., on a sharp chain conveyor). Sweep or flare may require that a log must be rotated a certain way (e.g., horns down) in order to be stable on the conveyor, and these requirements may take priority over value. If there is only one relatively stable orientation, the computer system may choose that orientation by default.

If there are multiple relatively stable orientations, the computer system may determine which provides the greatest value. The first computer system may use the 3D model of the log to simulate processing the log in different orientations, each orientation defined by a different combination of horizontal and vertical skew and offset. The best of each orientation parameter (rotation, horizontal skew, vertical skew, horizontal offset, and vertical offset) may be selected and captured during this process. At each simulated orientation, the system may simulate cutting the log into various center cant and side board combinations. Optionally, the combinations to be evaluated may be determined by a log breakdown rule, which may be chosen based on user inputs such as species, grade selections, and log features (e.g., diameter, length, sweep). Thus, the first computer system may simulate and assess a number of potential cut solutions for the log and select one of the cut solutions (the 'optimized cut solution') for implementation based on one or more factors such as projected value, risk (e.g., predicted stability of the log on a sharp chain), processing cost, and/or throughput speed. Thus, in some embodiments the first computer system may be configured to simulate multiple orientations of the 3D model of the log and assess the likely stability of the log on a sharp chain in each of the orientations (or vice versa), determine the potential cut solutions for each of the orientations deemed likely to be sufficiently stable on the sharp chain, and select one of those cut solutions as the 'optimized cut solution' based on the monetary value of the predicted products, predicted through-put speed, and/or products needed to fill an order.

Figure 14A:
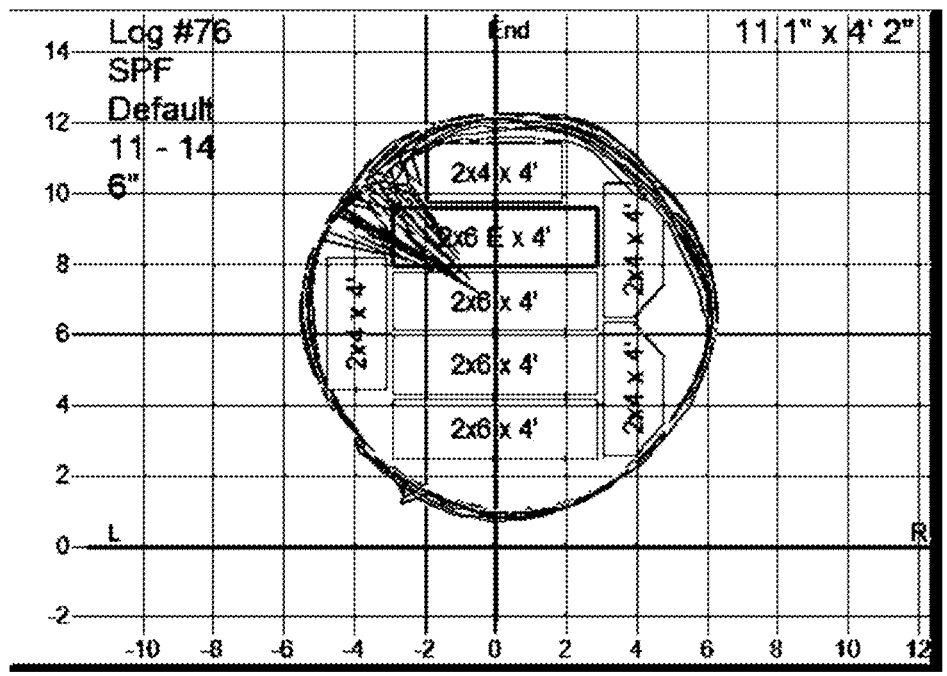
FIGS. 14A and 14B illustrate cut solutions for additional source logs.
Figure 14B:
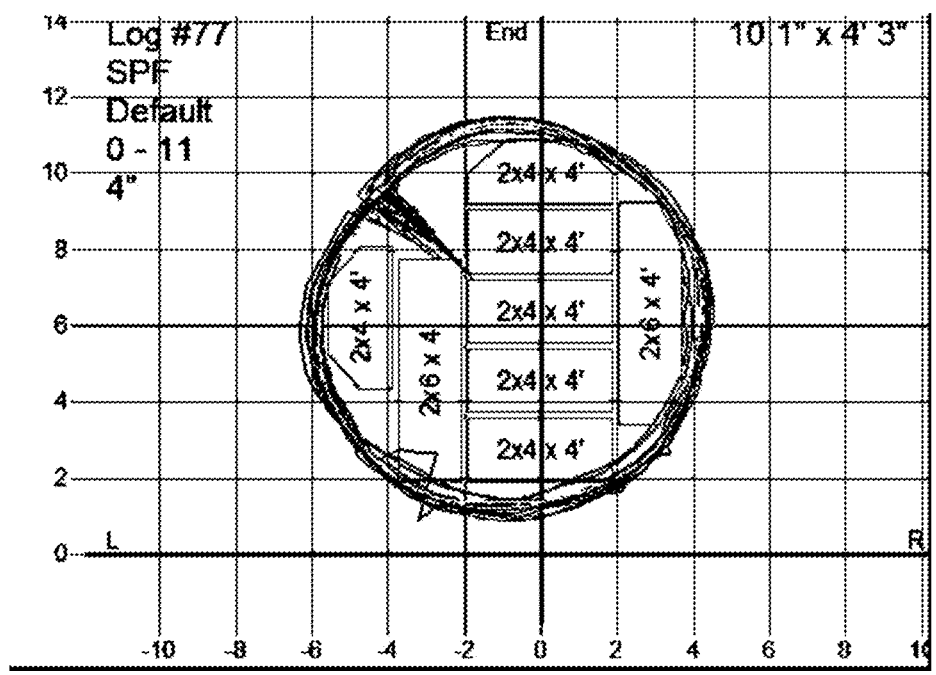

If splits or other defects have been detected on/in the log, the first computer system may also use the information about detected defects in the determination of the rotation angle/position and/or the optimized cut solution. For example, in some embodiments the first computer system may have a default rule (e.g., set or selected by a user) to place split defects in a predetermined location, such as to the side or at the top, or to place them at a predetermined angle. Alternatively, the first computer system may have a default rule to allow splits in predicted products (see e.g., FIG. 14A), or to disallow splits in boards in predicted products (see e.g., FIG. 14B). In other embodiments, the computer system may be configured to either allow or disallow splits in predicted products based on the value of the predicted products (e.g., to select the most valuable cut solution whether or not it includes splits in the predicted products).

In other embodiments, the computer system may determine one or more cut solutions without allowing splits in the predicted products, determine another one or more cut solutions that do allow splits in the predicted products, and select from among all of the cut solutions the one that provides the highest value. In still other embodiments the computer system may use a combination of rule-based analysis and value-based analysis (e.g., disallow splits in certain products but not in others, or disallow splits in a product only if the split extends through the middle third of the product, or allow splits that extend through a side board but not into the center cant, or allow splits that extend through only one product but not through two, etc.). In other embodiments, the first computer system may determine the optimized cut solution without assessing split defects, or without predicted log stability, or based on a different combination of factors.

Figure 12:
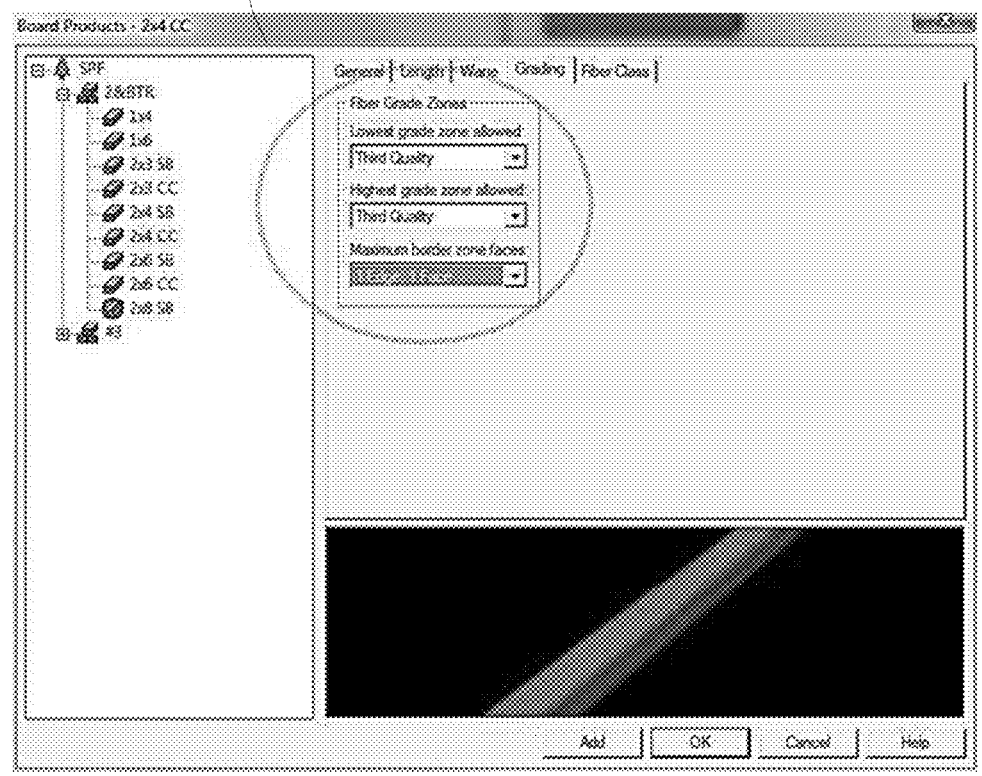
FIG. 12 illustrates a user interface with user-selectable optimization rules.
Figure 13A:
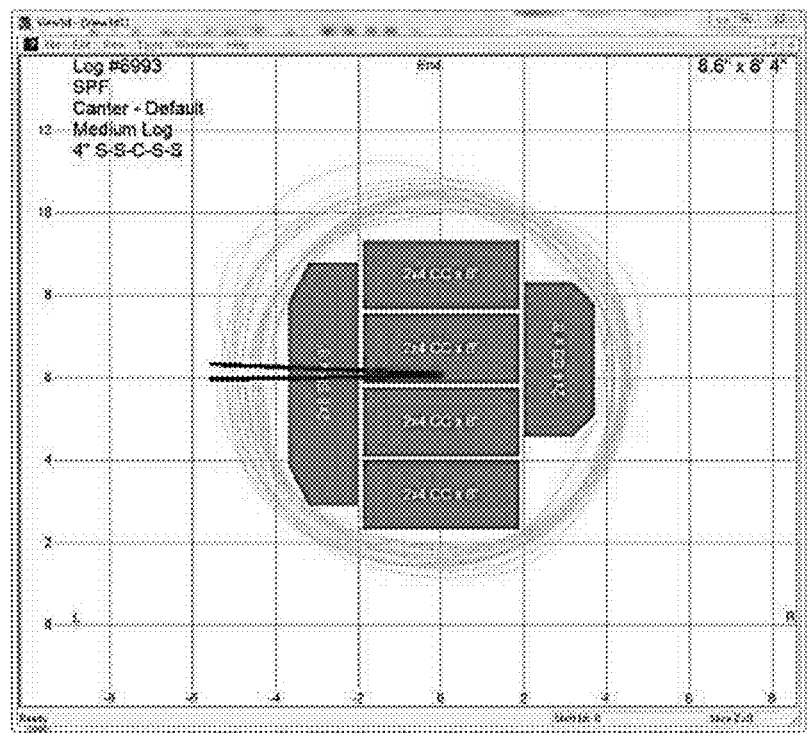
FIGS. 13A and 13B illustrate cut solutions for a source log.
Figure 13B:
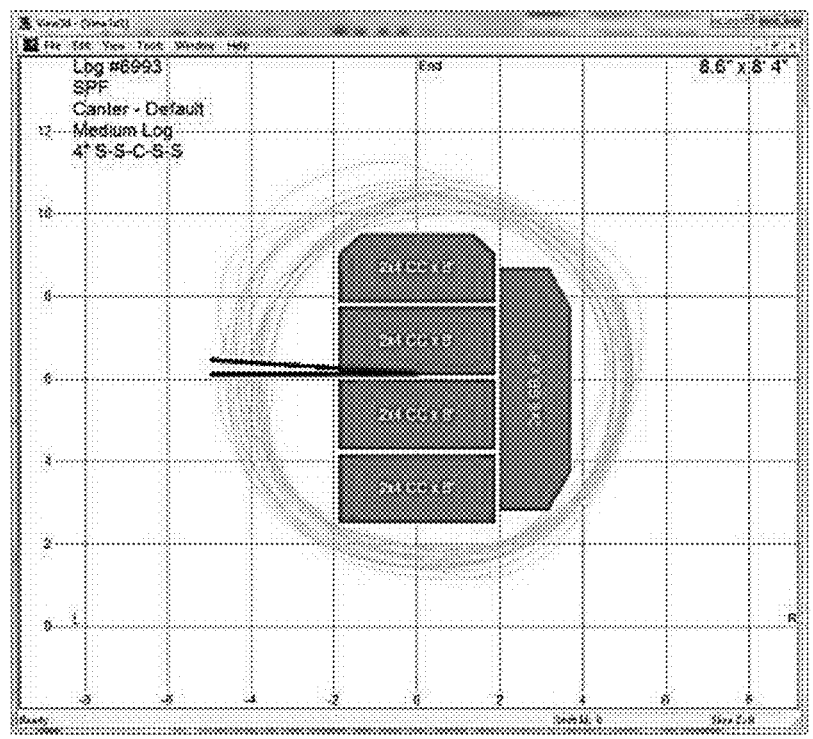

In a particular embodiment, the computer system may have a user interface configured to allow a human operator to select desired criteria for the optimized cut solution, such as a desired minimum grade zone, a maximum grade zone, and/or a maximum number of predicted product faces on which the split can impinge. For example, FIG. 12 illustrates such a user interface 1252, and FIGS. 13A and 13B illustrate corresponding cut solutions that do and do not adhere, respectively, to the defined criteria shown in FIG. 12. In some embodiments, the lowest value board grade may allow split defects, which may drive the solution to maximize the value of the high grade products.

The first scanner optimizer system may associate the 3D model, optimized cut solution, selected orientation parameters, and/or other data (e.g., non-selected orientation parameters, non-selected cut solutions, log breakdown rule, user inputs, scan data, etc.) with a corresponding log record in a queue.

At block 509, the log may be chipped into a cant according to the optimized cut solution. In some embodiments, the first computer system may generate and send (e.g., control system 132) a set of position instructions to a control system for use to position the chipper 12 to chip the log accurately.

At block 511, the cant may be scanned by additional geometric sensors (and optionally, additional vision sensors) in a second scan zone (e.g., scan zone B) downstream of the chipper. In this zone the chipped faces of the cant may be scanned by geometric sensors (and optionally, vision sensors). The second scan zone may be located between the chipper and saws 116, or between the chipper and profiler 114, or between a gang saw 134 and another machine center upstream of the gang saw (e.g., the chipper, the profiler, etc.). In some embodiments, the cant may be chipped on only two sides (e.g., lateral sides, or top and bottom) and the chipped faces may be rescanned by pairs of sensors. Alternatively, all four sides of the log may be chipped to form a four-sided cant, and two of the opposite faces or all four faces may be scanned.

At block 513, the second computer system may generate a model of the cant based at least on data from the sensors of the second scan zone and data generated by the first computer system and/or associated with the corresponding log record (e.g., log model, optimized cut solution, saw set, etc.). A corresponding process flow 800 is shown in FIG. 8.

Referring now to FIG. 8, at block 801 the second computer system may receive the scan data from the sensors of the second scan zone. The scan data may be received in the form of (x, y) coordinates that represent the outer shapes of the lateral sides of the cant at corresponding fixed intervals along the z axis (e.g., length) of the cant. Optionally at block 803 the second computer system may determine, based at least on the coordinates, sets of data points that represent the shape of the lateral sides of the cant at fixed intervals along the z axis of the cant. Again, in some embodiments the second computer system may assemble the coordinates into a 3D model and extrapolate or interpolate from the coordinates to determine the data points that represent the shape of the lateral sides of the cant at a desired fixed interval along the length of the cant. In other embodiments the corresponding sensors may collect the data at regular intervals, the second computer system may use the coordinates instead of generating data points, and block 803 may be omitted.

At block 805 the second computer system may transform the coordinates obtained from the second scan zone (if block 803 is omitted) or the corresponding data points (if block 803 is not omitted) to the same reference frame as the log to generate a rescan 3D model of the cant. In some embodiments, the second computer system may transform the coordinates/data points to the reference frame of the log by applying the previously-selected orientation parameters (skew and offset in both axes) to the coordinates/data points. At block 807 the second computer system may associate the rescan 3D model of the cant with the corresponding log record.

Referring again to FIG. 5, optionally at block 515 the second computer system may identify splits and/or other defects (e.g., knots, stain, etc.) based on the rescan 3D model of the cant. The identification of splits may proceed in the same or similar manner as described above with regard to block 505. Again, the defects may be identified based on geometric scan data, vision images, or a combination of geometric and vision data, obtained by scanning the cant in the second scan zone.

At block 517 the second computer system may re-optimize the cant based at least on the rescan 3D model of the cant. Optionally, in some embodiments the first computer system may have a first instance of optimization software for determining the optimized cut solution as described above with regard to block 507, and the second computer system may have a second instance of the same optimization software. The first instance may be configured as the 'server' (i.e., for loading, saving, and editing parameters and supplying to the parameters to 'clients'), and the second instance may be configured as the 'client,' which may have the parameters, defaults, rules, and/or other settings of the 'server' instance. Thus, in some embodiments the second scan zone may have 4 or 5 geometric sensors (and optionally, 4 or 5 vision sensors), and the second computer system may repeat some or all of the operations described above with regard to blocks 503-507 to generate a new 3D model of the entire cant and/or calculate a new optimized cut solution based on the scan data from the second scan zone.

However, in other embodiments the second computer system may be configured to re-use some of the parameters/data determined for the log by the first computer system to re-optimize the cant. A corresponding process flow is shown by way of example in FIG. 9.

Referring now to FIG. 9, at block 901 the second computer system may retrieve the previously-selected orientation parameters and the original cut solution for the log (e.g., from the corresponding log record). The second computer system may proceed through some or all of the operations described above with regard to blocks 503-507. However, for at least some of the operations, instead of performing a new analysis, the second computer system may select the corresponding parameter selected by the first computer system for the log. For example, the second computer system may re-use the orientation parameters deemed 'best' by the first computer system instead of simulating the cant in different orientations (different skews/offsets).

At block 903, the second computer system may re-evaluate at least the side portion(s) of the original optimized cut solution based at least on the rescan 3D model of the cant. If the second computer system has information about splits/defects in the log/cant, that information may also be used in the re-evaluation. For example, instead of calculating the geometry/dimensions of the cant from the rescan data, the second scanner optimizer system may assume that the cant has the geometry/dimensions of the cant defined by the original cut solution (if the cant is four-sided), or the geometry/dimensions defined by the original cut solution and 3D model of the log, collectively (if the cant is not four-sided). Likewise, instead of simulating and selecting orientation parameters for the cant, the second scanner optimizer system may use the orientation parameter(s) previously selected for the log.

In some embodiments the second computer system may re-use the portion of the original cut solution that corresponds to the center cant (e.g., center cant 14), but reassess the portion(s) of the optimized cut solution that correspond to flitch(es) and/or side board(s). For example, the second computer system may automatically select the portion of the optimized cut solution that corresponds to the center cant as the 'best' center cant solution, without selecting the portion of the optimized cut solution that corresponds to the original flitch/side board solution as the 'best' flitch/side board solution. In that case, the second computer system may determine a new flitch/side board solution without regard to the previously-selected flitch/side board solution.

Alternatively, if the simulated cut patterns for the selected orientation are associated with the log record, or are retrievable (e.g., from a buffer) by the second computer system, the second computer system may simulate cutting the cant according to some of those simulated cut patterns (e.g., those that include the previously-selected center cant solution) and select from among them the 'best' cut solution as the new optimized cut solution for the cant. In this case, implementing the new optimized cut solution might change the flitch/side board solution, but not the center cant solution. For example, if the optimized cut solution defines a side board to be profiled and cut from the cant, the system may use the rescan 3D model to determine whether to profile a different side board, or the same side board in a different position, or no side board at all, and the profilers may be adjusted accordingly if necessary. Similarly, if the optimized cut solution defines a flitch to be cut from the cant, the optimizer may use the rescan 3D model to determine whether to change the size or position of the flitch (e.g., cut the flitch from the opposite side) or eliminate the flitch. In either case, the re-optimized cut solution may define a different side board/flitch, but the same center cant and center boards, as the original optimized cut solution.

As another alternative, if the simulated cut patterns for the selected orientation are associated with the log record, or are retrievable by the second computer system, the second computer system may simulate cutting the cant according to one or more of the simulated cut patterns with different center cant solution (i.e., without assuming that the originally selected center cant solution is the 'best' solution). In this case, implementing the new optimized cut solution might change the flitch/side board solution, or the center cant solution, or both, or neither.

In still other embodiments, the second computer system may be configured to determine whether to use the log data/model or to use the cant data/model for various parts of the re-optimization. For example, the optimizer may compare the width of the actual cant (i.e., from one chipped face to the other chipped face) and/or the width of the chipped faces to the expected dimension(s) of the predicted cant defined by the original optimized cut solution. If the optimizer determines that the difference does not exceed a predetermined threshold, the optimizer may use the original cut solution, orientation parameters, etc. to re-optimize the flitch/side board portion of the cant. If the optimizer determines the difference does exceed the threshold, the optimizer may also re-optimize the cant, and/or use the cant data/model to recalculate any or all of the orientation parameters.

Again, splits along the cut faces of the cant 14/16 may be detected and processed generally as disclosed herein with regard to splits in logs, but with fewer sensors. The modification of the cut solution may be based at least in part on the new defect information. For example, if the original optimized cut solution was determined based at least in part on a split (e.g., FIG. 13B), and the cant scans downstream of the chipper indicate that the depth/extent of the split was over-estimated by the first computer system, the second computer system may reassess other simulated cut solutions calculated for the corresponding log in the corresponding orientation and select a new 'best' flitch/side board solution and/or center cant solution.

At block 905, the second computer system may modify the optimized cut solution or generate a new optimized cut solution based on the reevaluation. At block 907, the second computer system may associate the modified cut solution with the corresponding log record.

Referring again to FIG. 5, at block 519 the cant may be cut according to the re-optimized cut solution. In some embodiments, the second computer system may generate and send to a control system 132 a set of positioning instructions for use by the PLC(s) to position the profiler, saws, and/or other cutting devices to cut the cant according to the re-optimized cut solution.

Although the present disclosure describes a scanner optimizer system with three computer systems performing corresponding operations, those with ordinary skill in the art will readily appreciate that the operations may instead be performed by a single computer system, or distributed in other ways among multiple computer systems. For example, in some embodiments the first and second computer systems may generate 2D models of the predicted and actual flitches, respectively, or the first or second computer system may generate the 2D models. Likewise, in some embodiments the first computer system may include multiple computers, and the operations of the first computer system may be distributed among the computers (e.g., one computer generates the 3D model of the log, another computer determines the optimized rotational position, and a third computer determines the optimized cut solution). Still other embodiments may have only one computer system that performs all of the operations attributed herein to the first, second, and third computer systems. In some embodiments a computer system and some of the corresponding sensors may be integrated within a common housing, or may be separate components operatively connected.

Figure 15:
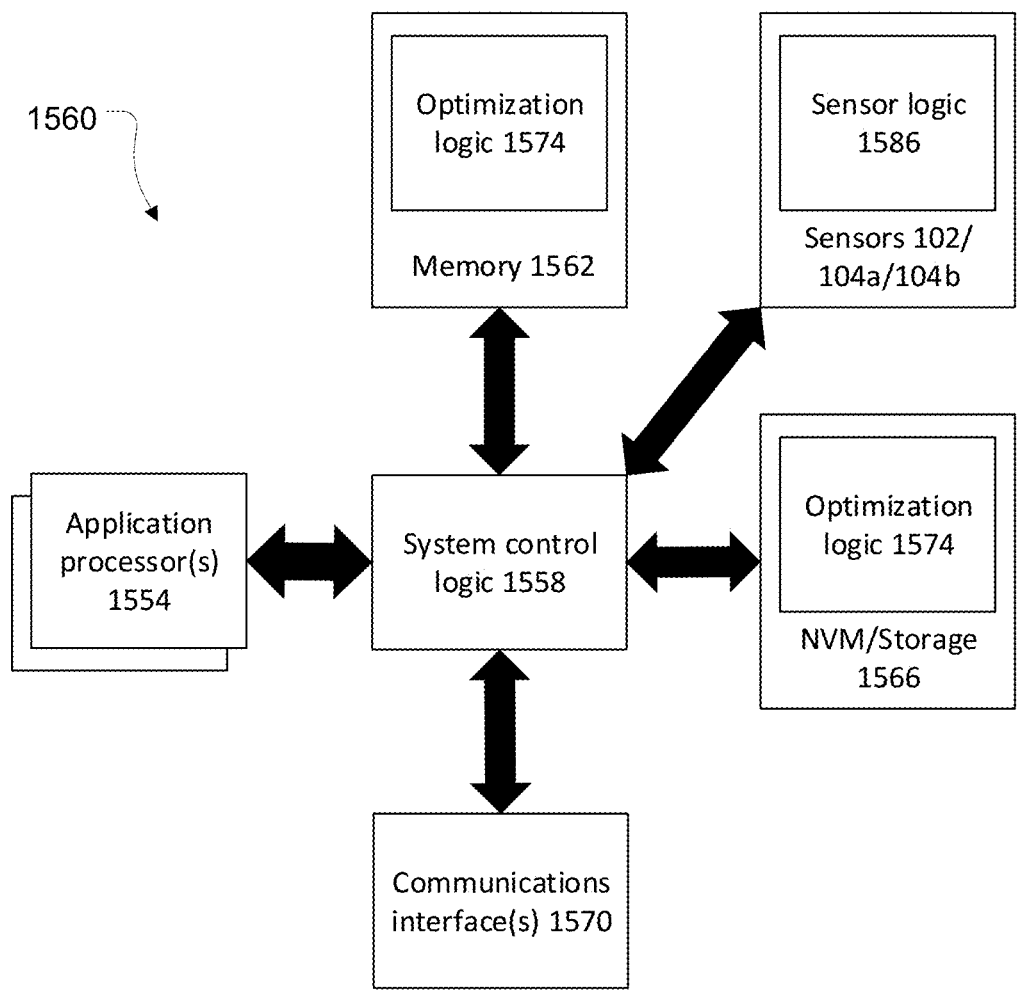
FIG. 15 illustrates a schematic diagram of a computer system, all in accordance with various embodiments.

FIG. 15 illustrates an example of a computer system 1550 suitable for performing some or all of the operations/methods described herein, in accordance with various embodiments. Computer system 1550 may have some or all of the features described herein with regard to various computer systems (e.g., first computer system 104, second computer system 126, and/or third computer system 106).

As illustrated, computer system 1550 may include system control logic 1558 coupled to at least one of the processor(s) 1554, memory 1562 coupled to system control logic 1558, non-volatile memory (NVM)/storage 1566 coupled to system control logic 1558, and one or more communications interface(s) 1570 coupled to system control logic 1558. In various embodiments, system control logic 1558 may be operatively coupled with sensors (e.g., sensors 102, 120, and/or 132) and/or an output device (e.g., user interfaces 128a-d). In various embodiments the processor(s) 1554 may be a processor core.

System control logic 1558 may include any suitable interface controller(s) to provide for any suitable interface to at least one of the processor(s) 1554 and/or any suitable device or component in communication with system control logic 1558. System control logic 1558 may also interoperate with the sensors and/or the output device(s). In various embodiments, the output device may include a display.

System control logic 1558 may include one or more memory controller(s) to provide an interface to memory 1562. Memory 1562 may be used to load and store data and/or instructions, for example, for various operations of lumber processing system 100. In one embodiment, system memory 1562 may include any suitable volatile memory, such as suitable dynamic random access memory ("DRAM").

System control logic 1558, in one embodiment, may include one or more input/output ("I/O") controller(s) to provide an interface to NVM/storage 1566 and communications interface(s) 1570.

NVM/storage 1566 may be used to store data and/or instructions, for example. NVM/storage 1566 may include any suitable non-volatile memory, such as flash memory, for example, and/or any suitable non-volatile storage device(s), such as one or more hard disk drive(s) ("HDD(s)"), one or more solid-state drive(s), one or more compact disc ("CD") drive(s), and/or one or more digital versatile disc ("DVD") drive(s), for example.

The NVM/storage 1566 may include a storage resource that may physically be a part of a device on which computer system 1550 is installed, or it may be accessible by, but not necessarily a part of, the device. For example, the NVM/storage 1566 may be accessed over a network via the communications interface(s) 1570.

System memory 1562, NVM/storage 1566, and/or system control logic 1558 may include, in particular, temporal and persistent copies of optimization logic 1574. The optimization logic 1574 may include instructions operable, upon execution by at least one of the processor(s) 1554, to cause computer system 1550 to practice one or more aspects of operations described herein (e.g., generate a 3D model of a log, generate a rescan model of a cant, generate an unfurled 2D model of a log, determine an optimized rotational position/skew/offset/cut solution, re-optimize cut solutions or portions thereof, map vision data to geometric data, analyze vision/geometric data to detect splits or other defects, create and update log records, monitor/analyze performance of saws and other equipment, etc.)

Communications interface(s) 1570 may provide an interface for computer system 1550 to communicate over one or more network(s) and/or with any other suitable device. Communications interface(s) 1570 may include any suitable hardware and/or firmware, such as a network adapter, one or more antennas, a wireless interface, and so forth. In various embodiments, communication interface(s) 1570 may include an interface for computer system 1550 to use NFC, optical communications (e.g., barcodes), BlueTooth or other similar technologies to communicate directly (e.g., without an intermediary) with another device. In various embodiments, the wireless interface may interoperate with radio communications technologies such as, for example, WCDMA, GSM, LTE, and the like.

The capabilities and/or performance characteristics of processors 1554, memory 1562, and so forth may vary. In various embodiments, computer system 1550 may include, but is not limited to, a smart phone, a computing tablet, a laptop computer, a desktop computer, and/or a server. In various embodiments computer system 1550 may be, but is not limited to, one or more servers known in the art.

In one embodiment, at least one of the processor(s) 1554 may be packaged together with system control logic 1558 and/or optimization logic 1574. For example, at least one of the processor(s) 1554 may be packaged together with system control logic 1558 and/or optimization logic 1574 to form a System in Package ("SiP"). In another embodiment, at least one of the processor(s) 1554 may be integrated on the same die with system control logic 1558 and/or positioning logic. For example, at least one of the processor(s) 1554 may be integrated on the same die with system control logic 1558 and/or positioning logic to form a System on Chip ("SoC").

The computer system 1550 may be configured to perform any or all of the calculations, operations, and/or functions described above and/or in FIGS. 5-9 or other Figures.

Using existing information to reoptimize the cut solution for the cant may enable reoptimization of the cant in a shorter time and with less processing power (and fewer sensors) than would be required to generate an entirely new 3D model using only the cant scan data. This may in turn allow the scanner optimizer system to detect defects along the cants downstream of the chipper, such as splits, knots, and other defects, and to re-optimize the cant in view of the defects. Re-optimization may improve value/recovery from a log that was not turned correctly, or a log that shifted after the turn, by enabling the scanner optimizer system to correct the profiler and/or saws to offset the error.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A non-transitory computer-readable medium programmed with instructions that are operable, upon execution by a processor of a computer, to cause the computer to:
cause a cutting device to cut at least one flat face along a log according to a first cut solution for the log to thereby obtain a first cant, wherein the first cut solution defines a first plurality of cut products to be cut from the log, and the plurality of cut products includes a first board;
determine a geometric profile of the flat face based on data obtained by one or more profile sensors positioned to scan the flat face;
modify or recalculate at least a first portion of the first cut solution based at least on the geometric profile of the flat face, wherein the first portion of the cut solution defines the first board, and wherein modifying or recalculating the first portion includes eliminating the first board, modifying a size of the first board, or modifying a position of the first board relative to the log or the first cant; and
cause one or more second cutting devices to cut the first cant into pieces according to the modified or recalculated cut solution.

2. The non-transitory computer-readable medium of claim 1, wherein the instructions are operable, upon execution by the processor, to cause the computer to:
generate a model of the log; and
determine the first cut solution based at least on the model of the log,
wherein modifying or recalculating at least the first portion of the cut solution includes generating a model of the cant based on the geometric profile of the flat face and on the model of the log and/or the first cut solution.

3. The non-transitory computer-readable medium of claim 2, wherein the instructions are operable, upon execution by the processor, to cause the computer to determine the first cut solution by:
using the model of the log to simulate cutting the log in a plurality of orientations, each of the orientations having a corresponding combination of skew and offset values,
determining a corresponding plurality of cut solutions for the log, and
selecting the first cut solution from among the plurality of the cut solutions.

4. The non-transitory computer-readable medium of claim 3, wherein each of the cut solutions of said plurality defines a corresponding combination of cut products to be cut from the log, and wherein the instructions are operable, upon execution by the processor, to cause the computer to determine the combinations based at least in part on a log breakdown rule and/or one or more user inputs.

5. The non-transitory computer-readable medium of claim 3, wherein the instructions are operable, upon execution by the processor, to cause the computer to select the first cut solution based on projected value of the predicted cut products, risk, processing cost, and/or throughput speed.

6. The non-transitory computer-readable medium of claim 3, wherein generating the model of the cant includes transforming said geometric profile of the flat face to the skew and offset values of the first cut solution.

7. The non-transitory computer-readable medium of claim 1, wherein the first board is a side board, the pieces include the first board and a center cant, and a second portion of the cut solution defines the center cant.

8. The non-transitory computer-readable medium of claim 7, wherein modifying at least the first portion of the cut solution includes modifying the first portion and the second portion of the cut solution.

9. The non-transitory computer-readable medium of claim 1, wherein the pieces include a center cant and one or more side boards, the first portion of the first cut solution defines the center cant and a plurality of boards to be cut from the center cant, and the first board is one of said plurality of boards, and a second portion of the cut solution defines the one or more side boards to be cut from the first cant.

10. The non-transitory computer-readable medium of claim 1, wherein the instructions are operable, upon execution by the processor, to cause the computer to detect a split along the flat face based at least on the geometric profile and/or a vision image of the first cant, wherein modifying the first cut solution includes modifying the first cut solution based at least on the detected split.

11. The non-transitory computer-readable medium of claim 10, wherein detecting the split includes using the geometric profile to identify or measure an indentation along the flat face and using the vision image to verify the identification or adjust the measurement of the indentation.

12. The non-transitory computer-readable medium of claim 11, wherein the pieces include the first board and a center cant, the first board is a side board, and a second portion of the cut solution defines the center cant.

13. The non-transitory computer-readable medium of claim 12, wherein modifying at least the first portion of the cut solution includes modifying the first portion and the second portion of the cut solution.

14. The non-transitory computer-readable medium of claim 11, wherein the pieces include a center cant and one or more side boards, the first portion of the first cut solution defines the center cant and a plurality of boards to be cut from the second cant, and the first board is one of said plurality of boards, and a second portion of the cut solution defines the one or more side boards to be cut from the first cant.

15. A non-transitory computer-readable medium programmed with instructions that are operable, upon execution by a processor of a computer, to cause the computer to:
receive a geometric profile of a primary workpiece from one or more geometric sensors, wherein the primary workpiece is a log;
receive one or more images of the surface of the primary workpiece from one or more vision sensors;
detect a split in the primary workpiece based at least on the geometric profile;
determine or modify a cut solution for the primary workpiece based at least in part on the detected split; and cause one or more cutting devices to cut the primary workpiece into a center cant and one or more secondary workpieces according to the determined or modified cut solution.

16. The non-transitory computer-readable medium of claim 15, wherein the one or more geometric sensors is a plurality of geometric sensors, and the one or more vision cameras is a plurality of vision cameras, and the instructions are operable, upon execution by the processor, to cause the computer to detect the split based on the geometric profile and at least one of the one or more images.

17. The non-transitory computer-readable medium of claim 16, wherein the plurality of geometric sensors includes at least four geometric sensors.

18. The non-transitory computer-readable medium of claim 15, wherein detecting the split includes generating a model of the primary workpiece based on the geometric profile and mapping at least one of the one or more images to the model of the primary workpiece.

19. The non-transitory computer-readable medium of claim 18, wherein detecting the split further includes using the model of the primary workpiece to identify an indentation and to estimate the length and/or depth of the indentation, and using said at least one of the one or more images to verify the identification or to adjust the estimated length and/or depth of the indentation.

20. The non-transitory computer-readable medium of claim 18, wherein the model is a 3D model, and the instructions are further operable, upon execution by the processor, to cause the computer to cause an output device to display the 3D model in a 2D unfurled configuration.

* * * * *